(12) United States Patent
Shao et al.

(10) Patent No.: US 12,025,155 B2
(45) Date of Patent: Jul. 2, 2024

(54) HANDHELD BLOWER

(71) Applicant: Chervon (HK) Limited, Wanchai (HK)

(72) Inventors: Xiandian Shao, Nanjing (CN); Toshinari Yamaoka, Nanjing (CN); Fangjie Nie, Nanjing (CN); Jianpeng Guo, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 155 days.

(21) Appl. No.: 17/575,744

(22) Filed: Jan. 14, 2022

(65) Prior Publication Data

US 2022/0136526 A1 May 5, 2022

Related U.S. Application Data

(63) Continuation of application No. 16/693,549, filed on Nov. 25, 2019, now Pat. No. 11,248,626, which is a (Continued)

(30) Foreign Application Priority Data

Feb. 20, 2013 (CN) .......................... 201310054133.2
Mar. 29, 2013 (CN) .......................... 201310107859.8
(Continued)

(51) Int. Cl.
*F04D 29/54* (2006.01)
*A01G 20/47* (2018.01)
(Continued)

(52) U.S. Cl.
CPC .......... *F04D 29/545* (2013.01); *A01G 20/47* (2018.02); *F04D 19/002* (2013.01);
(Continued)

(58) Field of Classification Search
CPC ... A01G 20/47; F04D 19/002; F04D 25/0673; F04D 25/084; F04D 29/545; F04D 29/703
See application file for complete search history.

(56) References Cited

U.S. PATENT DOCUMENTS 4,884,314 A 12/1989 Miner et al.
5,035,586 A * 7/1991 Sadler .................. E01H 1/0809
417/364
(Continued)

FOREIGN PATENT DOCUMENTS

AU 2014100150 A4 3/2014
AU 2016100555 A4 * 6/2016 ............. A01G 20/47
(Continued)

OTHER PUBLICATIONS

Canadian Intellectual Property Office, Office Action regarding Canadian Appl. No. 2,828,569, dated Nov. 28, 2014, 3 pgs.
(Continued)

*Primary Examiner* — Marc Carlson
(74) *Attorney, Agent, or Firm* — Greenberg Traurig, LLP

(57) ABSTRACT

A handheld blower includes a fan for generating an air flow, a motor for driving the fan to rotate about a central axis, a battery pack for supplying power to the motor, an air duct portion including an air duct, the air duct extending long the central axis, a coupling portion for coupling with the battery pack, and a connection portion for connecting the air duct portion with the coupling portion. The fan is received in the air duct. The air duct includes an air duct inlet and an air duct outlet which are respectively located at the two ends of the air duct. The air duct inlet is located between the air duct outlet and the coupling portion. The connection portion is provided with an air intake space located between the air
(Continued)

duct inlet and the coupling portion. The air intake space is opened in a radial direction of the central axis.

20 Claims, 16 Drawing Sheets

Related U.S. Application Data continuation of application No. 16/373,263, filed on Apr. 2, 2019, now Pat. No. 10,487,850, which is a continuation of application No. 15/147,501, filed on May 5, 2016, now Pat. No. 10,337,526, and a continuation-in-part of application No. 16/035,003, filed on Jul. 13, 2018, now Pat. No. 10,264,739, which is a continuation of application No. 15/962,412, filed on Apr. 25, 2018, now Pat. No. 10,091,954, which is a continuation of application No. 15/601,668, filed on May 22, 2017, now Pat. No. 9,974,241, which is a continuation of application No. 15/427,673, filed on Feb. 8, 2017, now abandoned, which is a continuation of application No. 14/034,064, filed on Sep. 23, 2013, now Pat. No. 9,603,497.

(30) Foreign Application Priority Data

| Mar. 29, 2013 | (CN) | 201310110140.X |
| Mar. 29, 2013 | (CN) | 201310110462.4 |
| May 11, 2015 | (CN) | 201510235719.8 |
| May 11, 2015 | (CN) | 201510235758.8 |
| May 11, 2015 | (CN) | 201510235809.7 |
| May 11, 2015 | (CN) | 201510237994.3 |
| May 11, 2015 | (CN) | 201510238214.7 |

(51) Int. Cl.
  *F04D 19/00* (2006.01)
  *F04D 25/06* (2006.01)
  *F04D 25/08* (2006.01)
  *F04D 29/70* (2006.01)

(52) U.S. Cl.
  CPC ....... *F04D 25/0673* (2013.01); *F04D 25/084* (2013.01); *F04D 29/703* (2013.01)

(56) References Cited

U.S. PATENT DOCUMENTS

| 5,504,412 | A | 4/1996 | Chan et al. |
| 5,869,947 | A | 2/1999 | Zahuranec et al. |
| 6,158,082 | A | 12/2000 | Beckey et al. |
| 8,894,382 | B2 | 11/2014 | Binder | |
| 8,918,956 | B2* | 12/2014 | Pellenc | E01H 1/0809 |
| | | | | 15/344 |
| 9,155,431 | B2 | 10/2015 | Dyson | |
| 2004/0197175 | A1 | 10/2004 | Turner et al. | |
| 2005/0081321 | A1 | 4/2005 | Milligan et al. | |
| 2008/0022481 | A1 | 1/2008 | Reeves | |
| 2009/0180902 | A1 | 7/2009 | Tung et al. | |
| 2009/0241285 | A1 | 10/2009 | Hinklin et al. | |
| 2010/0192314 | A1* | 8/2010 | Otsuka | A47L 9/2884 |
| | | | | 15/3 |
| 2010/0022159 | A1 | 9/2010 | Rosskamp et al. | |
| 2011/0000048 | A1* | 1/2011 | Yamazaki | F02B 63/06 |
| | | | | 15/412 |
| 2011/0113592 | A1 | 5/2011 | Robison | |
| 2011/0198103 | A1 | 8/2011 | Suzuki | |
| 2011/0219571 | A1 | 9/2011 | Dyson et al. | |
| 2012/0076672 | A1* | 3/2012 | Binder | F04D 25/064 |
| | | | | 417/234 |
| 2013/0239357 | A1 | 9/2013 | Hoffman et al. | |
| 2013/0276258 | A1 | 10/2013 | Amann | |
| 2014/0234130 | A1 | 8/2014 | Yamaoka | F04D 25/0673 |
| | | | | 417/234 |
| 2015/0327352 | A1* | 11/2015 | Kikuchi | F04D 15/0066 |
| | | | | 417/364 |
| 2016/0169249 | A1* | 6/2016 | Takahashi | F04D 25/0673 |
| | | | | 417/423.14 |
| 2016/0330913 | A1* | 11/2016 | Shao | F04D 29/545 |
| 2017/0021489 | A1* | 1/2017 | Bylund | F04D 19/002 |
| 2017/0325410 | A1* | 11/2017 | Gao | A01G 20/47 |

FOREIGN PATENT DOCUMENTS

| CN | 103016586 A | 4/2013 | |
| CN | 103382708 A | 11/2013 | |
| CN | 104074155 A | 10/2014 | |
| WO | WO-2015161883 A1 * | 10/2015 | A01G 20/47 |

OTHER PUBLICATIONS

UC Santa Barbara Pump-House Apr. 2004 http://www.cs.cdu.edu.au/homepages/jmitroy/eng247/sect10.pdf https://web.archive.org/web/*/http://www.library.ucsb.edu:80/internal/libwaves/apr04/seawater-pumphous1.html.

United States Patent and Trademark Office, Office Action issued on U.S. Appl. No. 15/427,673, Notification Date Aug. 4, 2017, 22 pgs.

Canadian Patent Office, Office Action issued on CA patent appl No. 2,929,511, dated Apr. 3, 2017, 6 pgs.

Canadian Patent Office, Office Action issued on CA patent appl No. 2,929,511, dated Dec. 15, 2017, 4 pgs.

United States Patent and Trademark Office, Non-Final Office Action issued on U.S. Appl. No. 16/293,433, Notification Date of Apr. 11, 2019, 10 pgs.

* cited by examiner

HANDHELD BLOWER

CROSS REFERENCE TO RELATED APPLICATION

This application is a continuation of U.S. patent application Ser. No. 16/693,549 filed Nov. 25, 2019, now U.S. Pat. No. 11,248,626, entitled "Handled Blower", which is a continuation of U.S. patent application Ser. No. 16/373,263 filed Apr. 2, 2019, now U.S. Pat. No. 10,487,850, which is a continuation of U.S. patent application Ser. No. 15/147,501 filed May 5, 2016, now U.S. Pat. No. 10,337,526, entitled "Blower," which claims the benefit under 35 U.S.C. § 119(a) of Chinese Patent Application No. CN 20151023,8214.7, filed on May 11, 2015, Chinese Patent Application No. CN 201510237994.3, filed on May 11, 2015, Chinese Patent Application No. CN 201510235809.7, filed on May 11, 2015, Chinese Patent Application No. CN 201510235758.8, filed on May 11, 2015, and Chinese Patent Application No. CN 201510235719.8, filed on May 11, 2015, U.S. patent application Ser. No. 16/373,263 is also a continuation-in-part of U.S. patent application Ser. No. 16/035,003, filed Jul. 13, 2018, now U.S. Pat. No. 10,264,739, entitled "Handheld Blower," which is a continuation of U.S. patent application Ser. No. 15/962,412 filed Apr. 25, 2018, now U.S. Pat. No. 10,091,954, which is a continuation of U.S. patent application Ser. No. 15/601,668, filed May 22, 2017, now U.S. Pat. No. 9,974,241, which is a continuation of U.S. patent application Ser. No. 15/427,673, filed Feb. 8, 2017, now abandoned, which is a continuation of U.S. patent application Ser. No. 14/034,064 filed Sep. 23, 2013, now U.S. Pat. No. 9,603,497, entitled "Handheld Blower," which claims the benefit of CN 201310054133.2, filed on Feb. 20, 2013, CN 201310110462.4, filed on Mar. 29, 2013, CN 201310107859.8, filed on Mar. 29, 2013, and CN 201310110140.X, filed on Mar. 29, 2013, each of which are incorporated herein by reference in their entirety.

FIELD OF THE DISCLOSURE

The present disclosure relates generally to power tools and, more particularly, to a handheld blower.

BACKGROUND OF RELATED ART

Handheld blowers are commonly used gardening tools, which are used to clean the fallen leaves in the garden through an air flow. Currently known blowers include centrifugal type blowers and axial type blowers. The axial type blowers can generate greater air quantity to better satisfy the requirements of the users.

The blower generates the air flow through an air duct and a fan disposed within the air duct. In order to realize better blowing effect, it would be better that the air duct is designed to have a linear structure.

In order to improve the power and lengthen usage time, currently known blowers generally use a bigger battery pack. In order to assemble the battery pack and a gripping portion, the blower may have an air duct with a curved shape. However, a curved portion of the air duct makes air which flows through the curved portion slow down.

If a blower has an axial type fan to generate air flow and a curved air duct to direct the air flow, the speed of the air flow which the blower outputs may suffer a loss.

The statements in this section merely provide background information related to the present disclosure and may not constitute prior art.

SUMMARY

In one aspect of the disclosure, a blower includes a fan for generating an air flow, a motor for driving the fan to rotate about a central axis, a battery pack for supplying power to the motor, an air duct portion including an air duct, the air duct extending along the central axis, a coupling portion for coupling with the battery pack, and a connection portion for connecting the air duct portion with the coupling portion. The fan is received in the air duct. The air duct includes an air duct inlet and an air duct outlet which are respectively located at the two ends of the air duct. The air duct inlet is located between the air duct outlet and the coupling portion. The connection portion is provided with an air intake space located between the air duct inlet and the coupling portion. The air intake space is opened in a radial direction of the central axis.

In another aspect of the disclosure, a blower includes a fan for generating an air flow, a motor for driving the fan to rotate about a central axis, an air duct portion including an air duct, the air duct extending long the central axis, a coupling portion for coupling with a battery pack, the battery pack being capable of supplying power to the motor, a connection portion connected with the air duct portion and the coupling portion, and a gripping portion for a user to grip. The fan is received in the air duct. The air duct includes an air duct inlet and an air duct outlet which are respectively located at the two ends of the air duct. The air duct inlet is located between the air duct outlet and the coupling portion. The gripping portion includes a middle plane which is substantially parallel to the central axis. The connection portion is provided with an air intake space which is opened in a direction substantially perpendicular to the middle plane. The air intake space is disposed between the air duct portion and the coupling portion.

In yet another aspect of the disclosure, a blower includes a fan for generating an air flow, a prime mover for driving the fan to rotate about a central axis, a power source for supplying power to the motor, an air duct portion forming an air duct, the air duct extending long the central axis, and a connection portion for connecting the air duct portion with the power source. The fan is received in the air duct. The air duct includes an air duct inlet and an air duct outlet which are respectively located at the two ends of the air duct. The air duct inlet is located between the air duct outlet and the power source. The connection portion is provided with an air intake space located between the air duct inlet and the power source. The air intake space is opened in a radial direction of the central axis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected examples and not all possible implementations, and are not intended to limit the scope of the present disclosure. Corresponding reference numerals indicate corresponding parts throughout the several views of the drawings.

DETAILED DESCRIPTION

The following description of the following embodiments is merely exemplary in nature and is in no way intended to limit the scope of the invention hereinafter claimed, its application, or uses.

Figure 1:
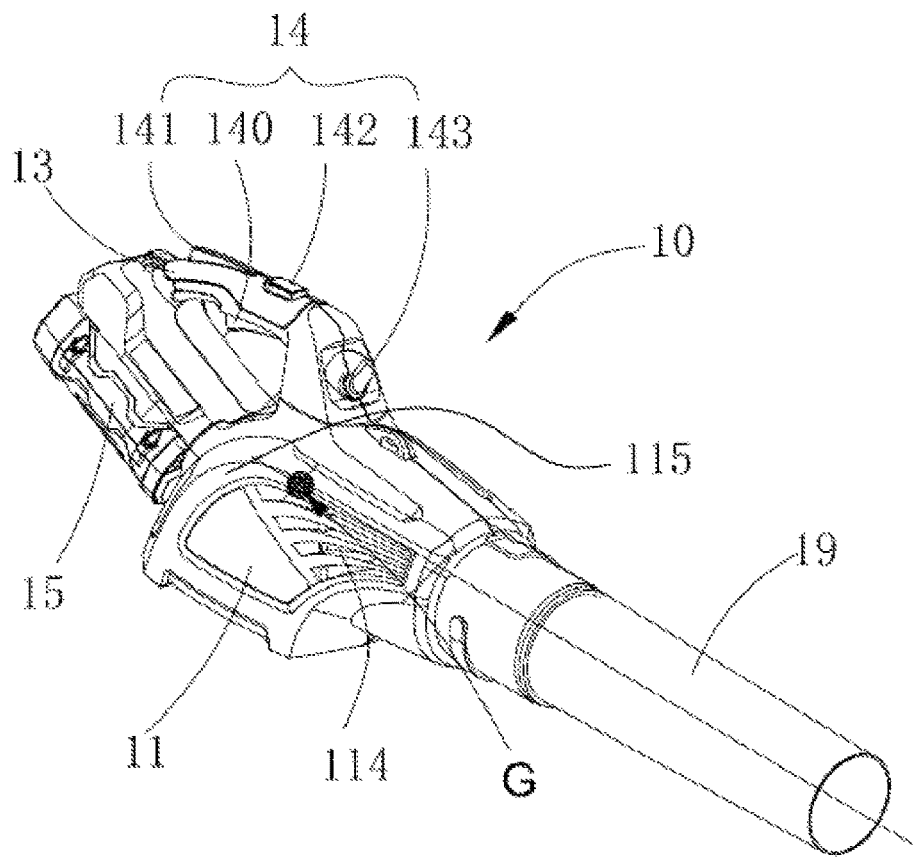
FIG. 1 is a perspective view of an exemplary handheld blower in a first embodiment of the present disclosure.
Figure 2:
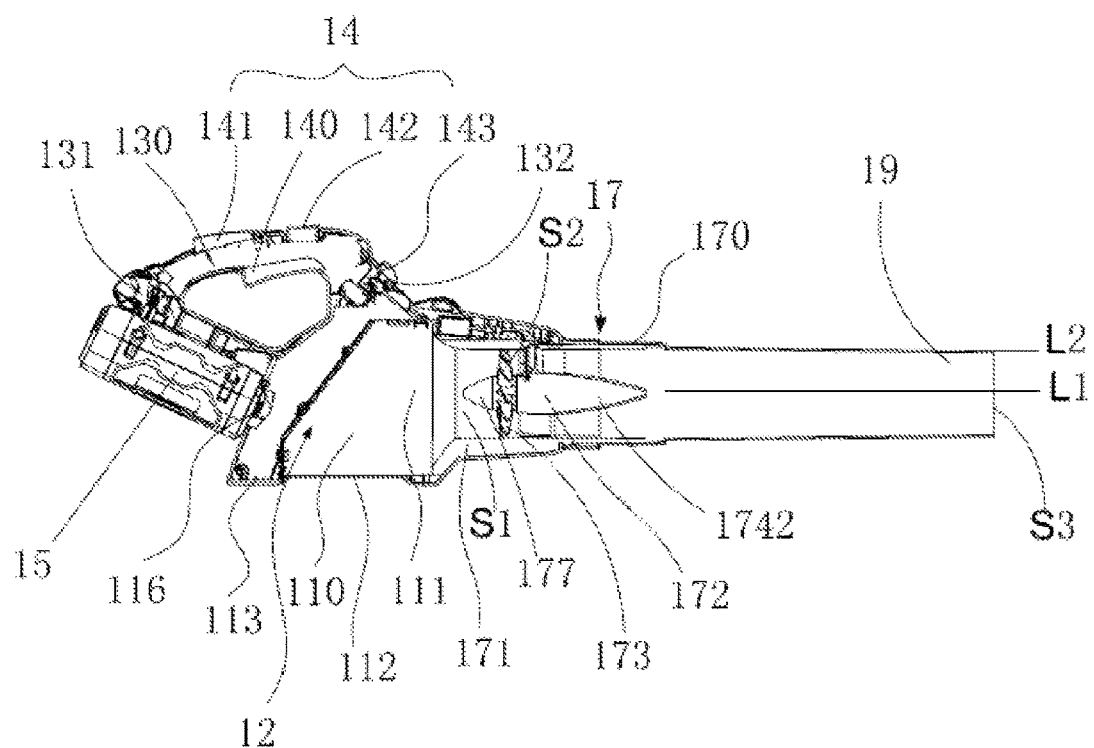
FIG. 2 is a front view of the handheld blower of FIG. 1 with the housing removed.

Referring to FIG. 1 and FIG. 2, in a first embodiment, a handheld blower 10 includes a housing 11, an air intake box 12, a handle 13, a control assembly 14, a battery 15, a duct assembly 17 and a blowpipe 19. The battery 15 and the duct assembly 17 are arranged on opposite ends of the housing 11 and the handle 13 is arranged on the housing 11. The housing 11 is connected with the blowpipe 19 by the duct assembly 17, and the air intake box 12 is arranged in the housing 11.

Figure 3:
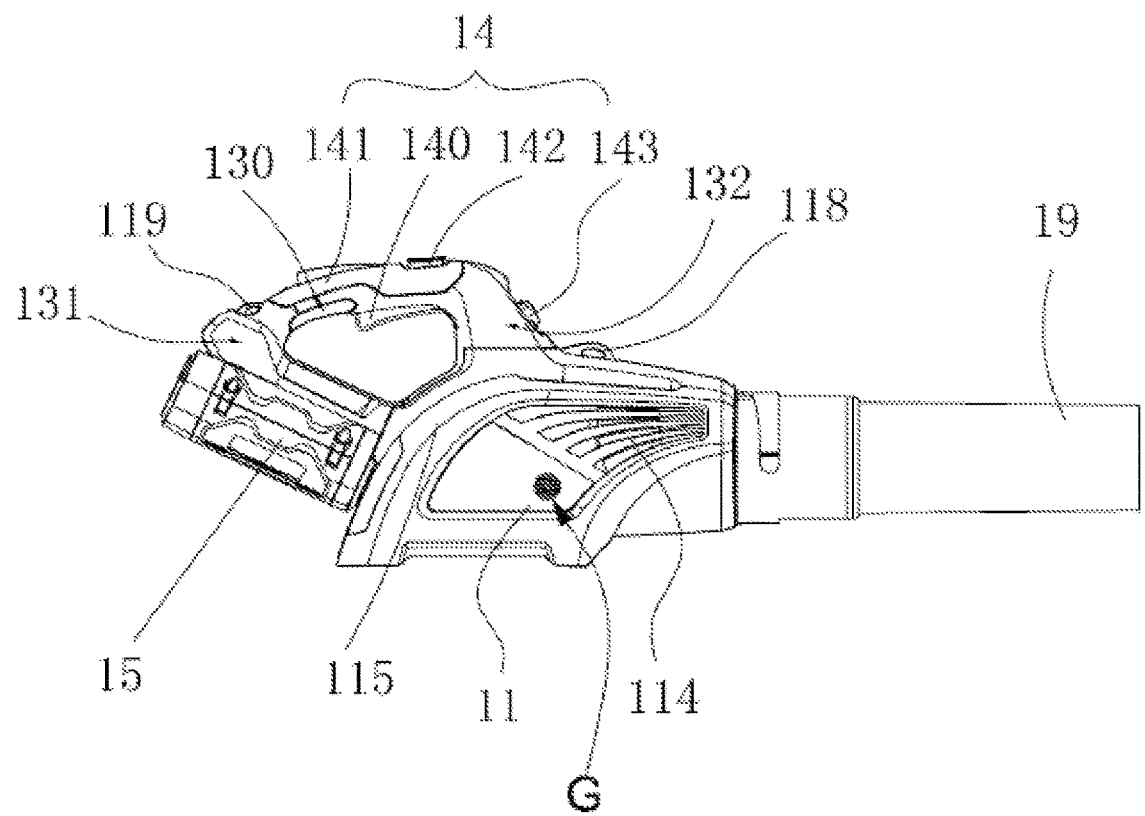
FIG. 3 is a front view of the handheld blower of FIG. 1.
Figure 4:
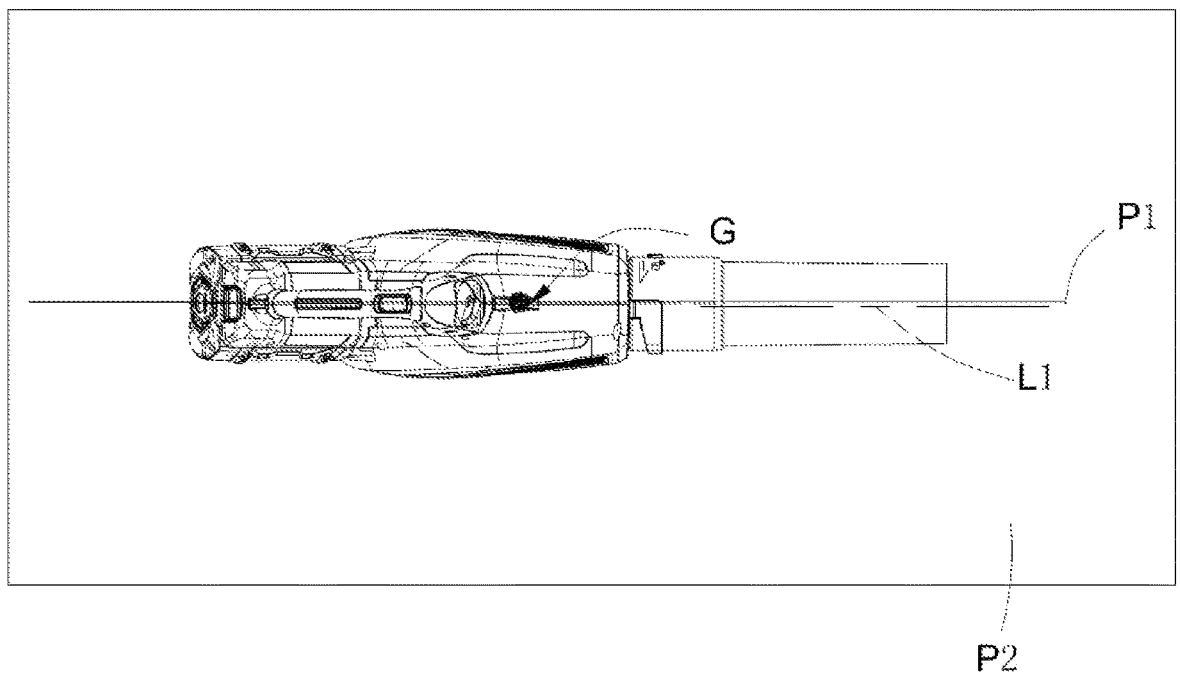
FIG. 4 is a top view of the handheld blower of FIG. 1.

Referring to FIGS. 2 and 3, the housing 11 includes an accommodating chamber 110, a mounting portion 111, a main air inlet 112, a secondary air inlet 113, a side air inlet 114 and a bending portion 115. The accommodating chamber 110 is formed in the housing 11, the air intake box 12 is mounted in the accommodating chamber 110, and one end of the duct assembly 17 is fixedly mounted in the mounting portion 111. The main air inlet 112 and the secondary air inlet 113 are arranged on the bottom of the housing 11, and the side air inlet 114 is arranged on a side wall of the housing 11. The airflow enters from the main air inlet 112 or the secondary air inlet 113, and is guided by the bending portion 115 to flow into the duct assembly 17 from the mounting portion 111. The side air inlet 114 can facilitate the entrance of the airflow and obtain a good entrance effect of the airflow. It should be noted that the side air inlet 114 may also be omitted.

Figure 5:
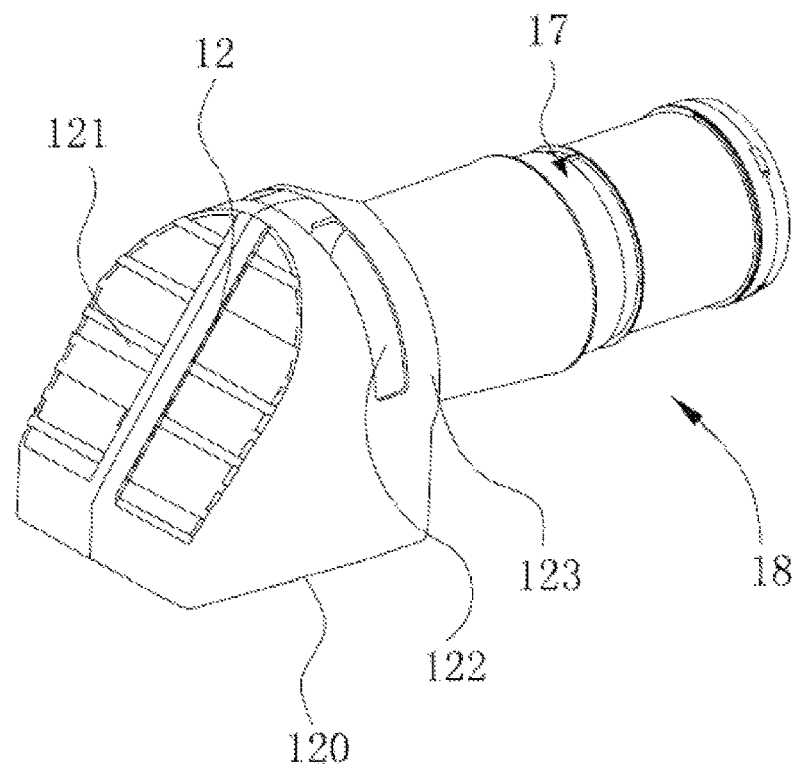
FIG. 5 is a view illustrating the connection between the air intake box and the duct assembly of the handheld blower of FIG. 1.
Figure 6:
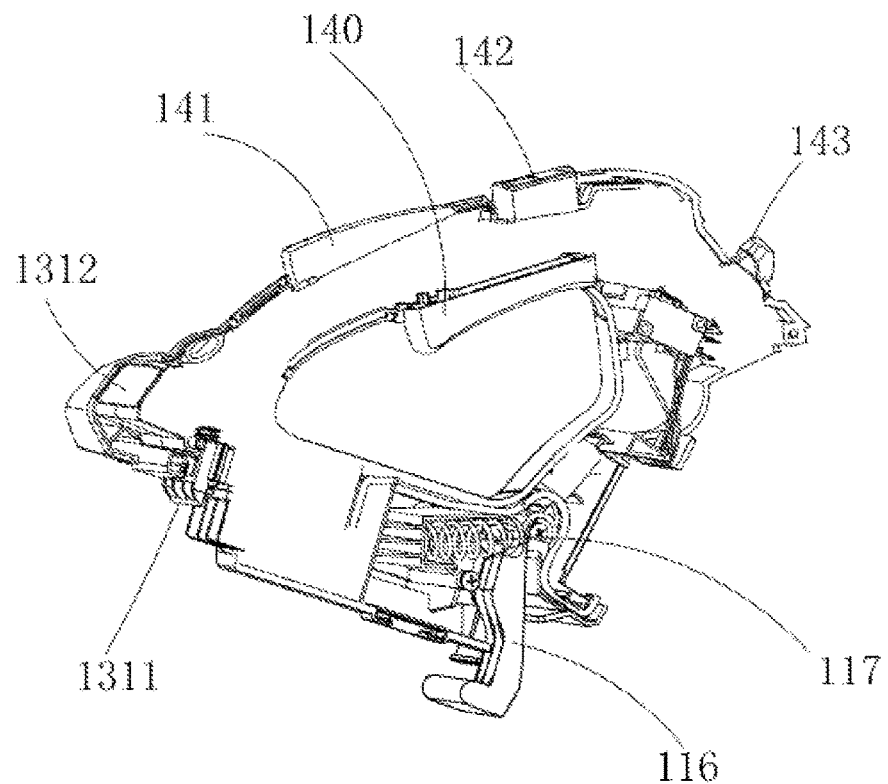
FIG. 6 is a view of the handle of the handheld blower of FIG. 1.

Referring to FIG. 5, the air intake box 12 includes a bottom air intake portion 120, a rear air intake portion 121, a side air intake portion 122 and an air outlet 123. The bottom air intake portion 120 and the rear air intake portion 121 are each configured as a grille structure, and the rear air intake portion 121 is configured as a ramp structure corresponding to the bending portion 115 of the housing 11. The air outlet 123 of the air intake box 12 is connected with an air intake end of the duct assembly 17. As such, the air intake box 12 and the duct assembly 17 may form an independent working unit 18, and the bottom air intake portion 120, the rear air intake portion 121 and the side air intake portion 122 of the air intake box 12 form a plurality of blowing passages with the air outlet 123 respectively, thus as long as the independent working unit 18 can be mounted into the housing and form the blowing passages, the machine can affect a blowing function no matter how the housing 11 changes. In this way, the shape of the handheld blower may be changed quickly without changing the inner working units. In the illustrated embodiment, the main air inlet 112 of the housing 11, the bottom air intake portion 120 and the air outlet 123 of the air intake box 12 cooperatively define a first blowing passage, the secondary air inlet 113 of the housing 11, the rear air intake portion 121 and the air outlet 123 of the air intake box 12 cooperatively define a second blowing passage, and the side air inlet 114 of the housing 11, the side air intake portion 122 and the air outlet 123 of the air intake box 12 cooperatively define a third blowing passage.

Referring to FIGS. 1, 2, 4 and 6, the handle 13 used to handle the handheld blower 10 is arranged on the bending portion 115 of the housing 11 and located above the housing 11 and the battery 15. The handle 13 includes a gripping portion 130, a battery mounting portion 131 and a speed adjusting portion 132, wherein the gripping portion 130 is arranged between the battery mounting portion 131 and the speed adjusting portion 132.

In the illustrated embodiment, a central axis L1 is defined on the blowpipe 19 in the length direction. The gravity center G of the whole blower is located in a plane P1, and the plane P1 is substantially perpendicular to the working ground P2 and parallel to the central axis L1. The housing 11, the battery 15, the duct assembly 17 and the blowpipe 19 are substantially arranged along the same line, and the gripping portion 130 of the handle 13 is arranged on opposite sides of the plane P1. Preferably, the gripping portion 130 of the handle 13 is symmetrically arranged on opposite sides of the plane P1. Thus, the machine has a compact structure, and the gravity center is close to the gripping portion, which reduces the force needed to overcome the deflection of the handheld blower during operation, enhances the comfort of the handling of the device and reduces operator fatigue during long times of gripping operation. It should be noted that the battery may also be arranged above or below the housing 11. The housing 11, the duct assembly 17 and the blowpipe 19 are substantially arranged along the same line. The gripping portion 130 of the handle 13 is arranged on opposite sides of the plane in which the gravity center is located. The plane is parallel to the axis of the blowpipe 19 and substantially perpendicular to the working ground P2 which is defined as a horizontal plane.

The control assembly 14 is used to control the switching-on or switching-off and the rotating speed of the handheld blower. The control assembly 14 includes a trigger 140 for controlling the switching-on or switching-off of the handheld blower, a locking button 141 for preventing a mistaken startup of the handheld blower, a boost button 142 for controlling the handheld blower to rotate at the maximum rotating speed and a speed adjusting button 143 for adjusting the rotating speed of the motor 172 of the handheld blower. The speed adjusting button 143 is arranged on the speed adjusting portion 132. For the sake of convenience, the trigger 140, the locking button 141 and the boost button 142 are all arranged on the gripping portion 130. With this position arrangement, the operator can press the trigger 140 while operating the boost button 142 by his thumb. Additionally, if the machine needs to be operated under high-speed blowing condition for a long time, the operator can press the boost button 142 and the locking button 141 by his palm simultaneously while handling the gripping portion 130, and can press the trigger 140 by his fingers. In this way, the handheld blower may be started by one-hand operation and continually operated at the maximum rotating speed, which reduces hand fatigue during the operation and enhances the comfort of handling the device. The locking button 141 is an assistant switch member for preventing the mistaken startup of the handheld blower. It may be appreciated that the locking button 141 may be omitted, and the operator can only use the trigger 140 and the boost button 142 to start up the handheld blower and keep a continuous operation.

The battery 15 is mounted to the housing 11 by the battery mounting portion 131, and used to provide power to the handheld blower. The housing 11 is provided with an ejecting head 116 for cooperating with the battery 15 and a battery mounting base (not shown). The ejecting head 116 is connected with a spring 117 and may rotate relative to the housing. When the battery 15 is assembled to the housing 11, the front end of the battery 15 pushes the ejecting head 116 to rotate against the elastic force of the spring 117 and deflect to a predetermined position. When the battery 15 is disassembled, the ejecting head 116 pushes the battery 15 towards the disassembling direction under the action of the spring 117.

The battery mounting portion 131 is provided with a battery latch 1311 for locking the battery 15 on the housing 11. The battery latch 1311 is further provided with a releasing button 1312 linked with it. By pressing or pushing the releasing button 1312, the battery latch 1311 is disengaged from the battery 15, and then the battery 15 may be removed conveniently under the action of the ejecting head 116. Certainly, the battery mounting portion 131 may also be arranged on the housing 11 as long as it can lock the battery 15 to the battery mounting base arranged on the housing 11 when mounting the battery 15.

Figure 7:
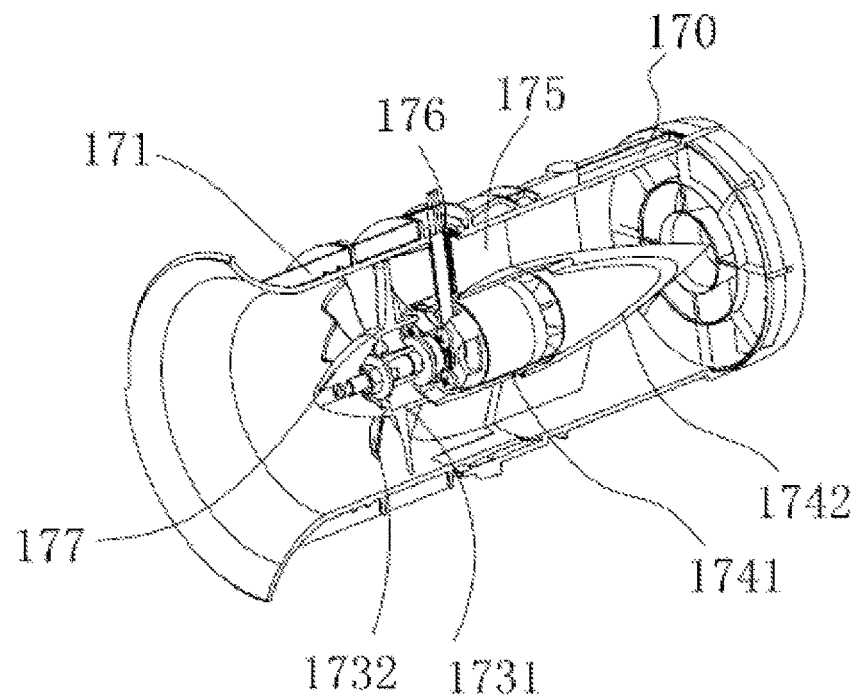
FIG. 7 is a sectional view of the duct assembly of the handheld blower of FIG. 1.
Figure 8:
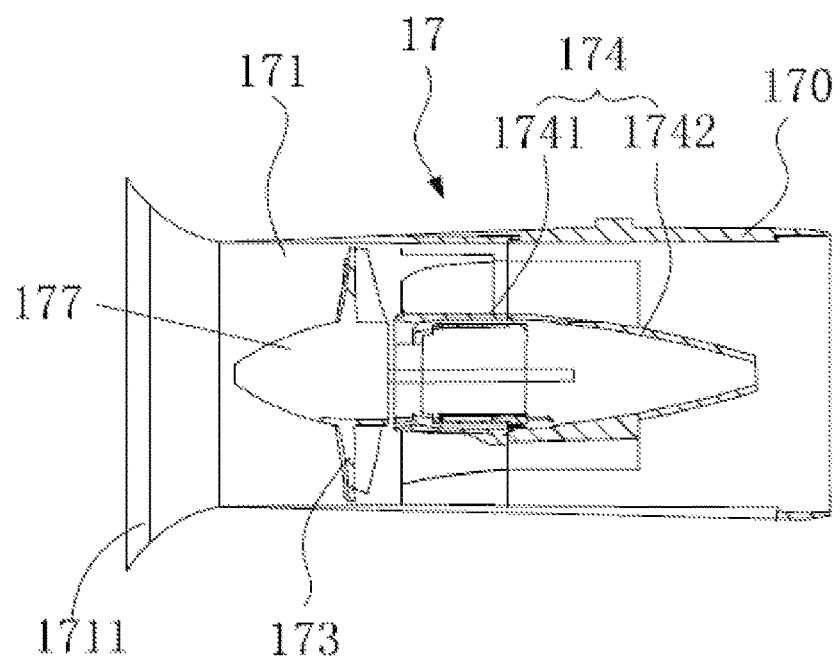
FIG. 8 is a perspective view of the duct assembly of the handheld blower of FIG. 1 with a portion of the duct and the connecting pipe removed.

Referring to FIG. 7 and FIG. 8, the duct assembly 17 includes a connecting pipe 170 connected with the blowpipe 19, a duct 171 connected to the housing 11, a motor 172 and a fan 173. The motor 172 is connected with the trigger 140 of the control assembly 14 by wires, and the connecting pipe 170 is locked with the duct 171. A supporting ring 174 for accommodating the motor 172 is arranged in the connecting pipe 170 and the duct 171. The motor 172 is mounted in the supporting ring 174 and the fan 173 is connected with the output shaft of the motor 172. A plurality of radial air guiding ribs 175 are integrally formed in the connecting pipe 170 and the duct 171. One end of each air guiding rib 175 is connected to the inner wall of the connecting pipe 170 or the duct 171, and the other end is connected to the supporting ring 174, wherein at least one air guiding rib 175 is provided with a channel 176 for the wires of the motor 172 to pass through. This arrangement not only increases the reliability of positioning the wires while reducing air resistance, it also eliminates the need of added members, thus the wires can be fixed easily, reliably and simply during assembly. It may be appreciated that if the length of the duct 171 is sufficient, the connecting pipe 170 may be omitted, and the supporting ring 174 and the air guiding ribs 175 can be directly arranged on the duct 171. The duct 171 has an air intake portion 1711 which is configured as a lip edge structure for facilitating the guidance of air in order to reduce the noise at the air intake portion 1711 of the duct. The above lip edge structure may be formed with the duct 171 in one piece or may be formed as a single member to be mounted to the duct 171.

In an embodiment of the present invention, the fan 173 is an axial fan, and the motor 172 is a brushless DC motor. The fan 173 is driven by the motor 172, and includes a hub 1731 mounted to the rotating shaft (not shown) of the motor and a plurality of blades 1732 mounted to the hub 1731. The blades 1732 and the hub 1731 may be formed in one piece or may be formed separately and then assembled together.

One end of the fan 173 adjacent to the housing 11 is provided with a fairing 177, and the other end of the fan 173 adjacent to the blowpipe 19 is connected with the motor 172. Since the fan 173 is an axial fan, after passing through the first blowing passage, the second blowing passage, the third blowing passage and entering the fan 173, the airflow axially passes through the air guiding ribs 175 under the action of the fan 173 and flows into the blowpipe 19. In an embodiment of the present invention, the supporting ring 174 includes an accommodating portion 1741 for accommodating the motor 172 and an air guiding portion 1742. The front end of the accommodating portion 1741 is provided with an opening, and the air guiding portion 1742 is a tapered structure integrally formed with the accommodating portion 1741. The air guiding portion 1742 is arranged on one end of the supporting ring 174 adjacent to the blowpipe 19 and has a plurality of air intakes for the cooling airflows to pass through. During the blowing process, since the air pressure around the motor 172 is larger than that around the fan 173, a secondary airflow is generated under the action of pressure differential. The secondary airflow passes through the air intakes of the air guiding portion 1742 and flows into the supporting ring 174 to cool the interior of the motor 172, and finally flows out from the opening on the front end of the accommodating portion 1741, thus the motor 172 may be cooled during the blowing process.

Still referring to FIG. 3, in order to facilitate the carrying of the machine, the handheld blower of the present invention further includes a strap with two ends connected to two hanging holes 118, 119 on the housing 11 respectively. The two hanging holes 118, 119 have the same distance from the center of the gripping portion 130, and the center point of the connecting line between the positions of the two hanging holes 118, 119 is located around the gravity center line of the whole machine.

The handheld DC blower is mainly used to blow fallen leaves and small garbage on the ground. It is proved by research that, in order to blow plenty of fallen leaves on the ground or some garbage, the air flow rate of the handheld blower generally needs to be larger than 395 cfm. The handheld DC blower in the current market with a battery pack mounted on the housing has a small battery capacity and a relatively low blowing efficiency, and thus cannot meet the requirement that the air flow rate is larger than 395 cfm and the working time is more than 5 min. Thus, in order to obtain relatively large air flow rate and relatively high blowing efficiency, it is required to optimize the battery capacity, the brushless DC motor, the parameters of the axial fan and the air passage design.

In order to obtain the desired air flow rate and working time, the capacity of the battery is generally larger than 170 wh. Generally, the capacity of the battery is proportional to the weight itself. As for the handheld blower, due to the requirement for the weight of the whole machine, the capacity of the battery pack is preferably in the range from 170 wh to 400 wh. On one hand, if the capacity of the battery pack is too small, the machine cannot meet the requirement for the air flow rate and the working time; on the other hand, if the capacity of the battery pack is too large, the tiredness during the operation may be increased, which is not convenient for a long-time operation.

Table 1 lists the effective working time of the handheld blower operated at the maximum air flow rate and the minimum air flow rate when the capacity of the battery is 200 wh and 300 wh. It can be seen from table 1 that if the capacity of the battery is constant, the air flow rate is inversely proportional to the working time, that is to say, the larger the air flow rate is, the shorter the working time will be. In accordance with the human engineering, through a number of simulation experiment analysis for the weight of the whole machine and the bearing degree of people, it can be determined that the performance parameters of the handheld blower suitable for most operators are as follows: the air flow rate is in the range from 385 cfm to 700 cfm and the working time is in the range from 20 min to 75 min.

TABLE 1

| Capacity of the battery | Maximum air flow rate | Minimum air flow rate |
| --- | --- | --- |
| 200 wh | 36 min | 120 min |
| 300 wh | 54 min | 180 min |

If the capacity of the battery is constant, in order to obtain a handheld DC handheld blower with an air flow rate larger than 395 cfm and higher blowing efficiency, it is required to optimize the brushless DC motor, the parameters of the axial fan and the air passage design.

Referring to FIGS. 7 and 8 again, the motor 172 is accommodated into the supporting ring 174 arranged in the duct 171 and the connecting pipe 170, and the hub 1731 of the axial fan 173 is mounted to the rotating shaft of the motor 172. In accordance with the principle of aerodynamics, in order to reduce the air resistance and increase the air speed, the contours of the fairing 177, the hub 1731 and the supporting ring 174 are designed using a streamlined shape, thus the diameter of the motor 172 may define the diameter of the hub 1731. In addition, when designing the axial fan, the ratio of the root diameter to the top diameter of the blade, i.e., the ratio of the diameter of the hub of the fan to the outer diameter of the blade, hereinafter referred to as hub ratio, is an important parameter. With the same outer diameter of the blade and the hub, the smaller hub and the longer blades are more suitable for the axial flow blower having low pressure and high flow rate. It is proved by simulation analysis that the blowing efficiency of the blades is relatively high when the hub ratio is in the range from 0.25 to 0.45. Thus, if the diameter of the motor is relatively large, the diameter of the hub would be relatively large accordingly. In order to set the parameter of the hub ratio in the optimal scope so as to obtain a higher blowing efficiency, the diameter of the blade would be increased accordingly, and thus the volume of the duct is increased and the volume of the whole machine is increased. As a result, both the shape design and the operating comfort during the actual operation will be affected adversely. Thus, the diameter of the motor is preferably no larger than 35 mm. In this way, the whole machine is light in weight and occupies a smaller space.

Figure 9:
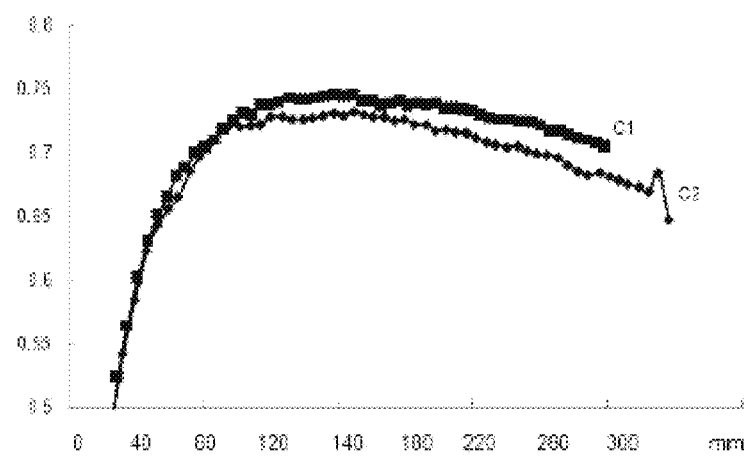
FIG. 9 illustrates the curve of the functional relationship between the outer diameter of the blade of the fan and the blowing efficiency of the handheld blower of FIG. 1.

In accordance with the scope of the hub ratio, it can be further concluded that the scope of the outer diameter of the blade is in the range from 78 mm to 140 mm, thus the blowing efficiency is higher. As shown in FIG. 9, C1 and C2 are curves illustrating the functional relationship between the outer diameter of the blade and the blowing efficiency, which is obtained by simulation modeling and analysis when the air flow rate is 560 cfm and 500 cfm respectively. It can be seen from FIG. 9 that the best blowing efficiency is obtained when the outer diameter of the blade is in the range from 85 mm to 140 mm. The blowing efficiency herein is defined as the ratio of the work caused by the flow of the airflow to the work consumed by the rotation of the blades of the fan.

Further, as the diameter of the motor is smaller than 35 mm and the ratio of the air flow rate to the diameter of the motor is larger than 12 cfm/mm, the handheld blower of the present invention can obtain higher blowing efficiency with a small motor as compared with the common handheld blower.

The following will describe the air passage design of the present invention in detail. Referring to FIG. 2 again, along the direction of the axis L1, the flow cross-section S1 of the air passage at the rear end of the fan 173 adjacent to the air inlet 112 is larger than the flow cross-section S3 at the air outlet 191 of the blowpipe 19, and a circular flow-through area is formed between the inner wall of the duct 171 and the hub 1731 of the fan. The ratio of the area of the flow cross-section S3 of the air outlet 191 of the blowpipe 19 relative to the area of the flow cross-section S2 of the circular flow-through area at the position of the axial fan 173 is preferably greater than or equal to 0.8. This arrangement can effectively improve the flow characteristic of the airflow, and enhance the blowing efficiency. Meanwhile, the air passage between the fan 173 and the air outlet 191 defines an outer contour line L2 having an angle relative to the axis L1. Preferably, the angle between the axis L1 and the outer contour line L2 is smaller than 8°. That is because a large angle can cause a certain air resistance against the airflow, so that the loss of the airflow in the wall of the air passage is increased and the loss of the high-speed airflow in the blowpipe 19 is also increased, which causes the reduction of the blowing efficiency of the whole machine. With the optimization for the above two parameters, a desired flow of airflow may be obtained, while a relative small pressure loss is obtained in the blowpipe 19, which can effectively improve the blowing efficiency.

In order to obtain a sufficient air flow rate at the air outlet 191, after being calculated by CFD (Computational Fluid Dynamics) and test data, it is common to design a relatively large area of the air outlet. Preferably, the area of the cross-section of the air outlet 191 is configured to be larger than 4300 mm2. Certainly, the air speed will reduce as the blowing area increases, thus the area of the air outlet is preferably in the range from 4300 mm2 to 8000 mm2 according to the actual operation.

By optimizing the capacity of the battery, the brushless DC motor and the parameters used in the design of the axial fan and improving the air passage design, when the capacity of the battery is in the range from 170 wh to 400 wh, the air flow rate of the handheld blower may be larger than 395 cfm, and the working time may be larger than 5 min, especially when the air flow rate is in the range from 430 cfm to 700 cfm. Meanwhile, it is also ensured that the ratio of the air flow rate to the input power is larger than or equal to 0.7 cfm/w when the handheld blower is operated at the maximum air flow rate, thus the blowing efficiency can be improved significantly.

Referring to FIGS. 10-13, a handheld blower 200 in a second embodiment includes a fan 10a, a motor 20, a battery pack 30 and a housing 40.

The fan 10a includes a plurality of fan blades, so that an air flow can be generated when the fan 10a is rotated.

The motor 20 is used to drive the fan 10a, and the fan 20 is capable of rotating about a central axis 21.

The battery pack 30 is used to supply power to the motor 20, and the motor 20 is capable of transforming electricity energy to mechanical energy so as to drive the fan 10a.

The handheld blower 200 includes three portions: an air duct portion 201, a coupling portion 202 and a connection portion 203.

Figure 10:
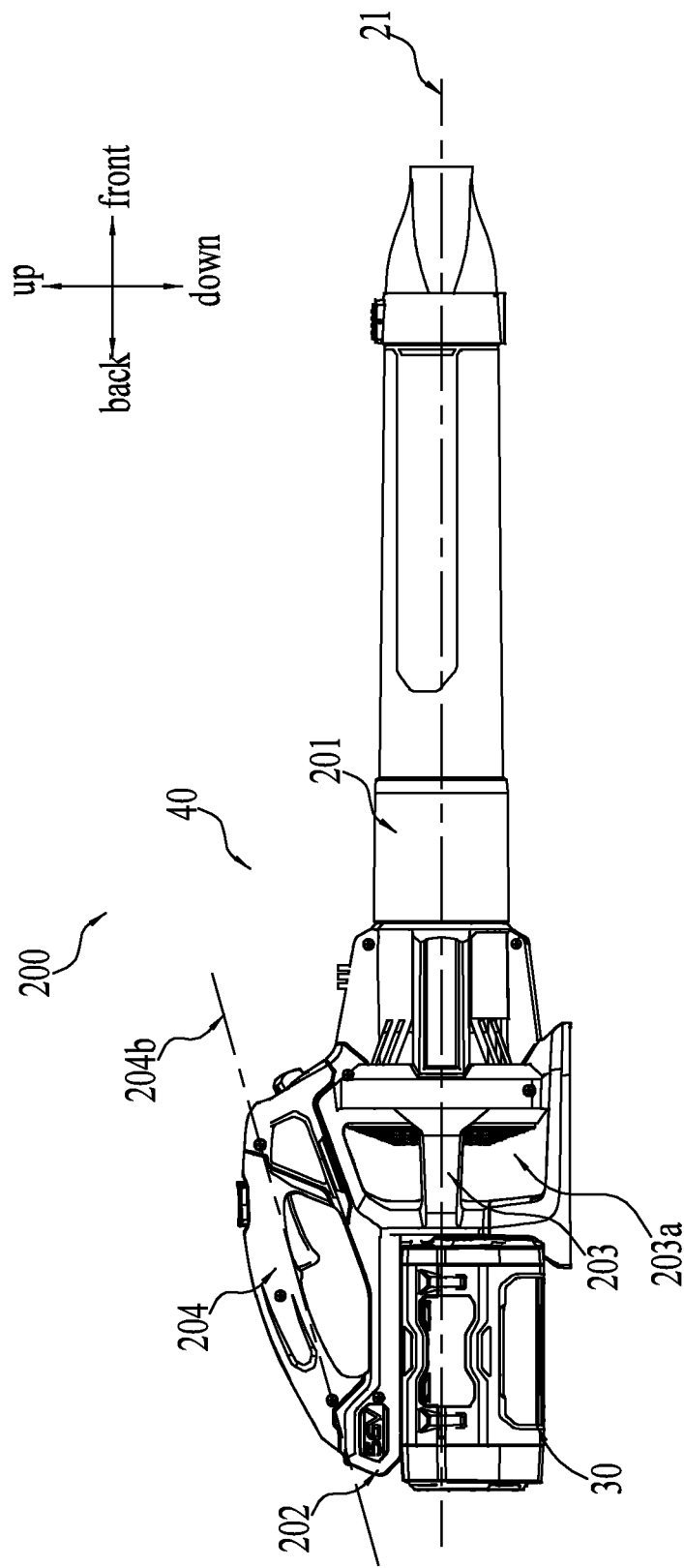
FIG. 10 is a schematic view of an example handheld blower in another embodiment.
Figure 11:
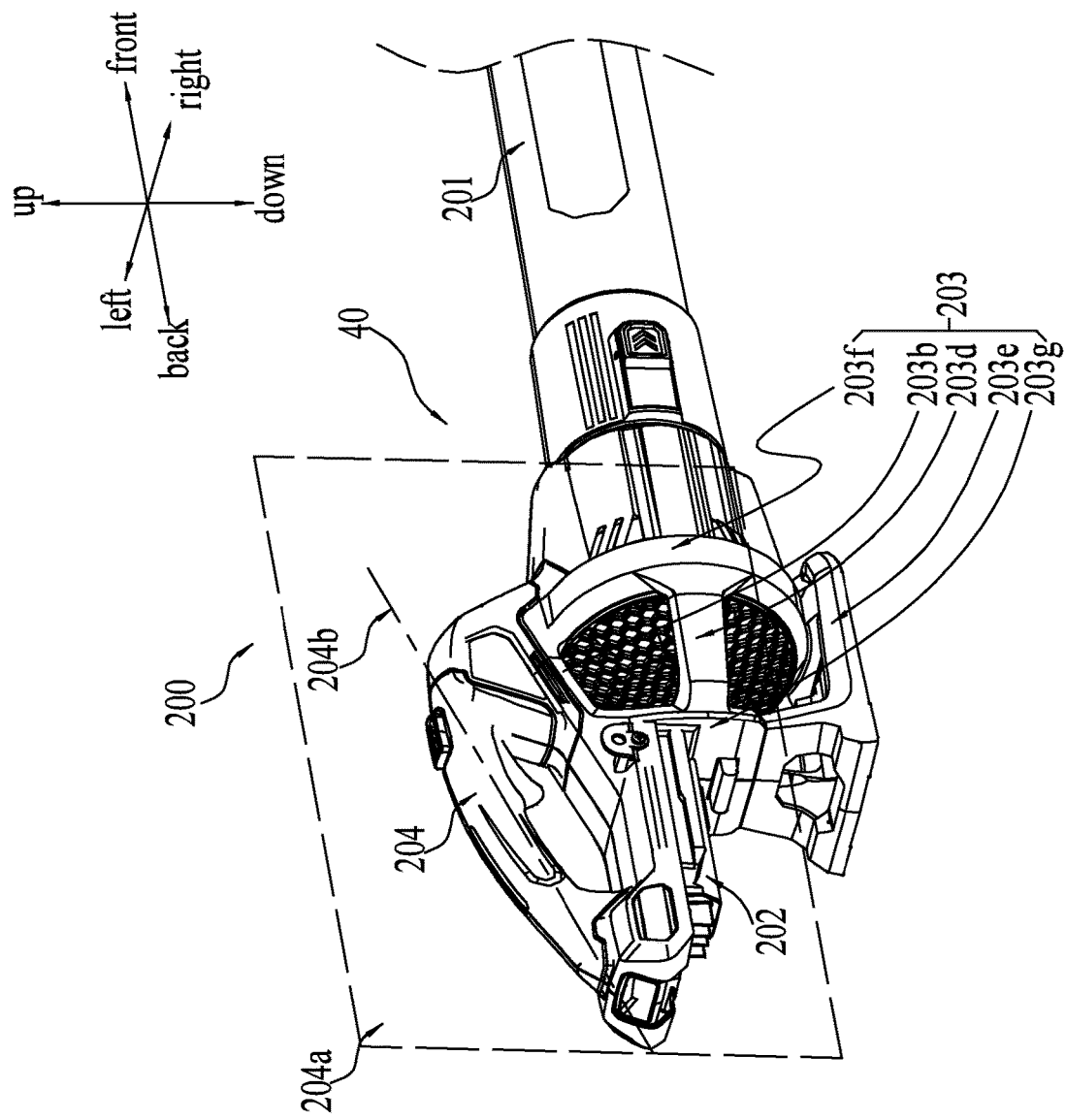
FIG. 11 is a schematic view of a portion of the handheld blower in FIG. 10.

For convenience of the reader only, the coordinates in FIGS. 10-11 define front, back, left, right, up and down directions. The front, back, left, right, up and down direction herein described will refer to these coordinates. These directional definitions are provided for convenience only and are not to be considered as being absolute locations. The front, back, left, right, up and down directions are relative to the handheld blower 200, which are not equal to the front, back, left, right, up and down directions of a user and not relative to the posture of the user.

Referring to FIGS. 10-13, the air duct portion 201 is disposed in the front of the connection portion 203, and the coupling portion 202 is disposed in the back of the connection portion 203. The central axis 21 can be parallel to a back and front direction.

The air duct portion 201, the coupling portion 202 and the connection portion 203 are arranged along a direction substantially parallel to the central axis 21.

The air duct portion 201 includes an air duct 201a extended along the central axis 21. The coupling portion 202 includes a structure for coupling with the battery pack 30. The connection portion 203 is used to connect the air duct portion 201 with the coupling portion 202.

The air duct 201a includes an air duct inlet 201b and an air duct outlet 201c which are respectively disposed on the two opposite ends of the air duct 201a.

The fan 10a is received in the air duct 201a and disposed between the air duct inlet 201b and the air duct outlet 201c. The air duct inlet 201b is disposed between the air duct outlet 201c and the coupling portion 202.

The connection portion 203 is provided with an air intake space 203a between the air duct portion 201 and the coupling portion 202 in a direction of the central axis 21. The air intake space 203a is adjacent to the air duct inlet 201b.

The connection portion 203 is at least extended in the direction of the central axis 21 to make the air duct portion 201 and the coupling portion 202 depart from each other so as to form the air intake space 203a therebetween. In an axial direction of the central axis, the air intake space 203a formed by the connection portion 203 is opened in a plurality of radial directions.

It is noted that, a radial direction here is a direction of a radius of a circle which is centered by the central axis 21 and which lies in a plane 12 that is substantially perpendicular to the central axis 21. For the circle, each angle of the circle corresponds to a radial, that is to say each angle represents a radial direction. The air intake space 203a being opened in a plurality of radial directions means the air intake space 203a is opened at least in a plurality of angles.

In order to ensure the air quantity, a sum of the plurality of angles that the air intake space 203a is opened should be greater than or equal to 30 degrees.

The sum of the plurality of angles that the air intake space 203a is opened can be selected among the following ranges: 30-45 degrees, 45-60 degrees, 60-75 degrees, 75-90 degrees, 90-105 degrees, 105-120 degrees, 120-135 degrees, 135-150 degrees, 150-165 degrees, 165-180 degrees, 180-195 degrees, 195-210 degrees, 210-225 degrees, 225-240 degrees, 240-255 degrees, 255-270 degrees, 270-285 degrees, 285-300 degrees, 300-315 degrees, 315-330 degrees, 330-345 degrees, 345-360 degrees, or 30-120 degrees, 120-210 degrees, 210-300 degrees, and 300-360 degrees.

The air intake space 203a is opened at least in the radial directions of a continuous angle range. The minimum value of the continuous angle range is greater than or equal to 5 degrees and less than or equal to 355 degrees.

Referring to FIGS. 10-13, the housing 40 includes a gripping portion 204 for the user to grip. The gripping portion 204 includes a middle plane 204a and is approximately symmetrical relative to the middle plane 204a. The air intake space 203a is opened in a direction substantially perpendicular to the middle plane 204a.

The middle plane 204a is substantially perpendicular to a left-right direction. That is to say, when the air duct portion 201 is arranged in the front of the connection portion 203, the coupling portion 202 is arranged in the back of the connection portion 203, and the central axis 21 is substantially parallel to the back and front direction, the air intake space 203a is opened in the left-right direction. In order to increase the air quantity, the air intake space 203a can be opened on its top and bottom and in the back. The air duct inlet 201b is arranged in front of the air intake space 203a.

For the central axis 21, the air intake space 203a can be opened on the upper left, upper right, bottom left and bottom right of the central axis 21, and some locations on the bottom.

As shown in FIG. 10, when the battery pack 30 is coupled to the coupling portion 202 of the housing 40, the gripping portion 204 and the battery pack 30 are respectively located on the upside and downside of the central axis 21. The air intake space 203a is opened on the upside and downside of the central axis 21.

The gripping portion 204 is extended along a line direction which is intersected obliquely with the central axis 21. The gripping portion 204 has a length direction in which a substantial portion of the gripping portion 204 is located.

The air intake space 203a can be opened in a direction substantially perpendicular to a plane which is formed by the intersection of a line 204b that the length direction of the gripping portion 204 is located and the central axis 21.

Referring to FIGS. 10-11, the gripping portion 204 is symmetrical relative to the middle plane 204a, the line 204b is located within the middle plane 204a, and the central axis 21 can be arranged within the middle plane 204a. With this arrangement, the plane which is formed by the line 204b that the length direction of the gripping portion 204b defines and the central axis 21 is the middle plane 204a. As shown in FIG. 11, the air intake space 203a is opened in the direction substantially perpendicular to the middle plane 204a.

It is noted that, the air intake space 203a being opened in certain direction means the air flow can enter into the air intake space 203a along the certain direction, not that there is necessarily any physical structure in the certain direction. In other words, if there is no continuous physical structure formed by the connection portion 203 to totally cover the certain direction so that the air flow cannot be entered into the air intake space 203a along the certain direction, which needs to go round the physical structure along other directions, it is considered that the air intake space 203a is opened in the certain direction.

Referring to FIGS. 10-13, the connection portion 203 includes a cantilever 203b, a left arm 203c, a right arm 203d, a base 203e, a front support 203f and a rear support 203g. The left and right arms 203c, 203d can be arranged symmetrically.

The front support 203f is generally annular shaped, which surrounds the air duct inlet 201b. The rear support 203g is located between the battery pack 30 and the air intake space 203a.

The cantilever 203b is extended from the rear to the front and toward the oblique upper direction. The left arm 203c is extended from the rear to the front and toward the left side obliquely. The right arm 203d is extended from the rear to the front and toward the right side obliquely. Thus, the cantilever 203b, the left arm 203c and the right arm 203d form a space, and the space is increased gradually from the rear to the front, so that the air intake space 203a is opened enough at the air duct inlet 201b to assure the enough air quantity. The cantilever 203b, the left arm 203c and the right arm 203d is respectively inclined at an angle less than or equal to 60 degrees relative to the central axis 21.

The cantilever 203b is disposed on the top of the air intake space 203a. The left arm 203c and the right arm 203d are respectively disposed on the left and right side of the air intake space 203a. The base 203e is disposed on the bottom of the air intake space 203a. The front and rear supports 203f, 203g are respectively disposed on the front side and rear side of the air intake space 203a.

The air intake space 203a is opened between the cantilever 203b and the base 203e except a part blocked by the left and right arms 203c, 203d, and an object can go through between the cantilever 203b and the base 203e along the left-right direction.

The cantilever 203b, the left arm 203c, the right arm 203d and the base 203e are connected with the front and rear supports 203f, 203g, which are distributed discretely in a circumferential direction of the central axis 21. The space between the cantilever 203b, the left arm 203c, the right arm 203d and the base 203e can be considered as belonging to the air intake space 203a. The front and rear supports 203f, 203g form the cantilever 203b, the left arm 203c, the right arm 203d and the base 203e which are distributed discretely connect as a whole in the front and rear sides, and make them connect with the air duct portion 201 and the coupling portion 202. The front and rear supports 203f, 203g constitute a boundary of the air intake space 203a in the direction of the central axis 21.

The air duct portion 201 and the coupling portion 202 can be connected through one structure along the central axis 21, such as one of the cantilever 203b, the left arm 203c, the right arm 203d and the base 203e. The front and rear supports 203f, 203g can be omitted, and the one structure is directly connected with the air duct portion 201 and the coupling portion 202.

In view of the structural strength and the usage safe, two connection structures can be used to connect the air duct portion 201 and the coupling portion 202. It is needed to arrange a front structure in the front side to connect the front ends of the two connection structures, and a rear structure in the back side to connect the rear ends of the two connection structures.

Figure 12:
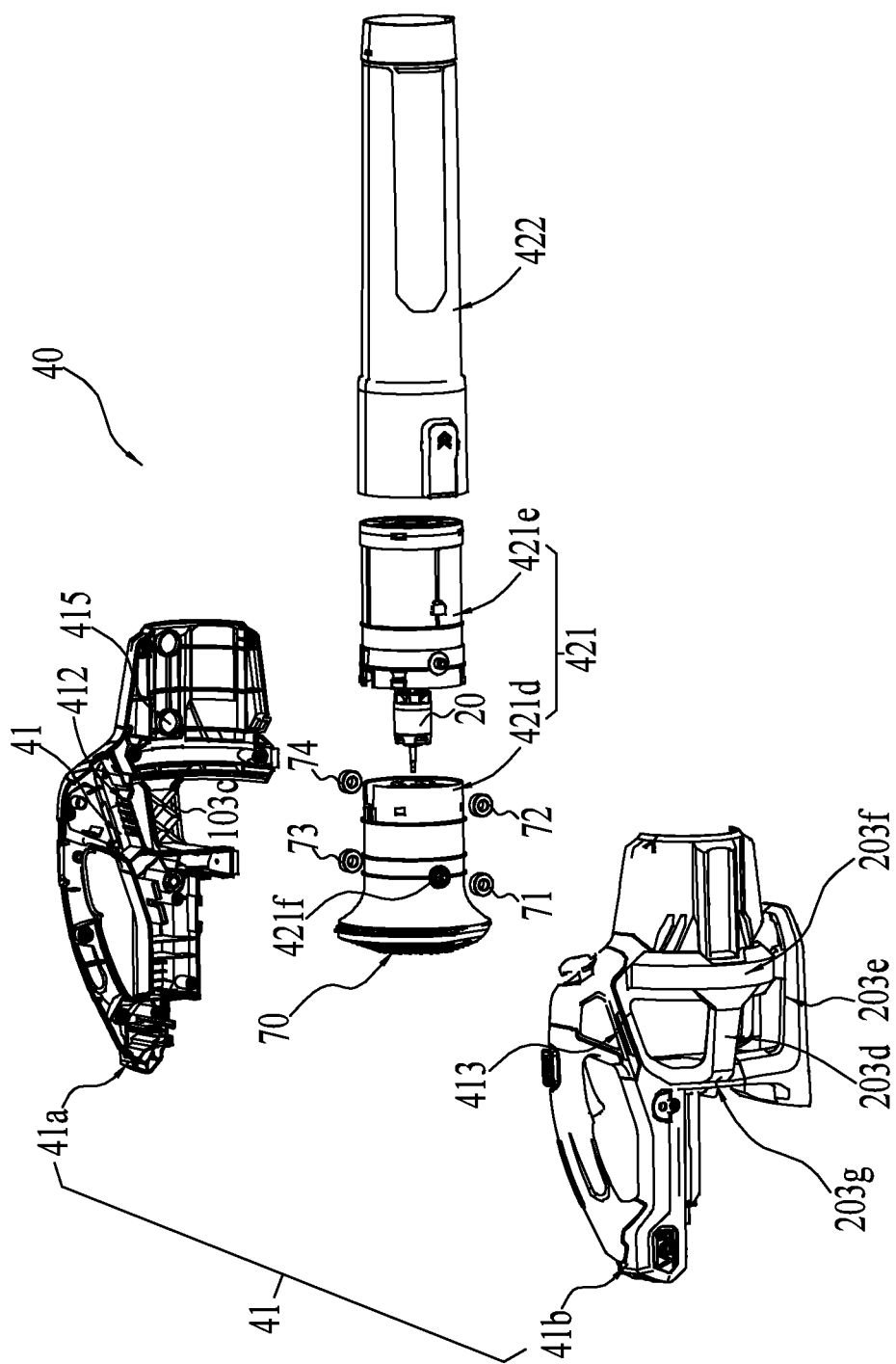
FIG. 12 is an exploded view of the handheld blower in FIG. 10, wherein a battery pack of the handheld blower is removed.

Two or three of the front support 203f, the rear supports 203g, the cantilever 203b, the left arm 203c, the right arm 203d and the base 203e in FIGS. 10-12 can constitute the connection structures.

Figure 18:
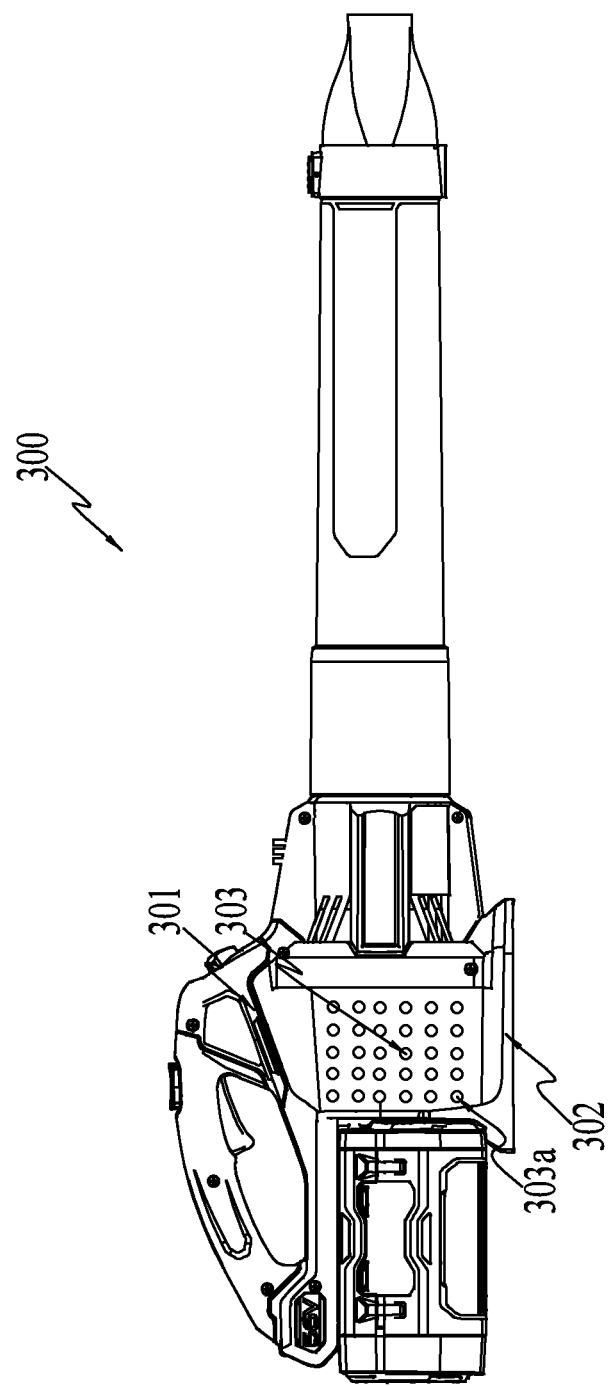
FIG. 18 is a schematic view of an example handheld blower in another embodiment.

In order to avoid foreign matter being absorbed into the air intake space 203a due to the opening of the air intake space 203a, as shown in FIG. 18, a handheld blower 300 in a third embodiment includes a shield 303. The shield 303 is provided with holes 303a. The handheld blower 300 has the same structure as the handheld blower 200 in FIG. 10 except the connection portion. The connection portion of handheld blower 300 only includes a cantilever 301 and a base 302.

The gripping portion 204 includes a first end and a second end. The first end is connected with the cantilever 203b, and the second end is connected with the coupling portion 202. The coupling portion 202 is located under the gripping portion 204 and in the back of the connection portion 203.

Referring to FIGS. 10-13, the housing 40 includes a plurality of components. Specifically, the housing 40 includes a main housing 41 and an air duct housing 42.

The main housing 41 is used to constitute the coupling portion 202, the connection portion 203 and the gripping portion 204. The air duct housing 42 is used to constitute the air duct portion 201.

The connection portion 203 can be constituted totally by the main housing 41. Also, the connection portion 203 can be constituted partially by the main housing 41. For example, the cantilever 203b, the left arm 203c, the right arm 203d, the front support 203f and the rear support 203g can be constituted by the main housing 41, and the base 203e can be constituted by a single component. Otherwise, the cantilever 203b may have a hollow structure for containing some elements.

Figure 14:
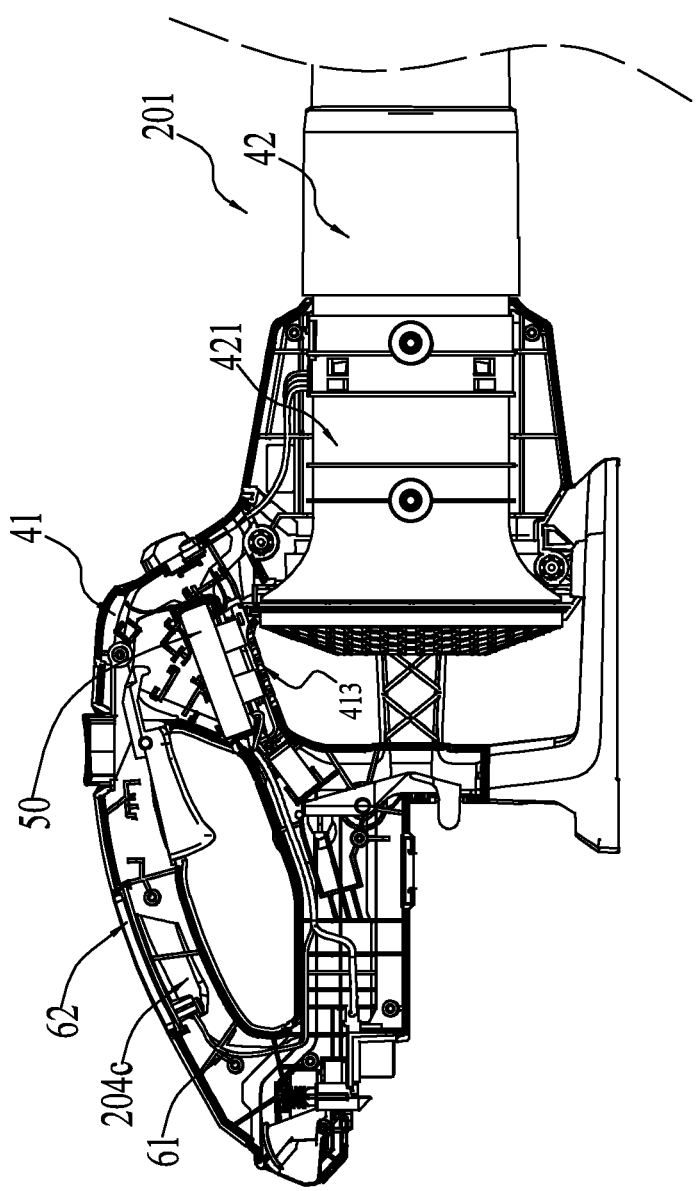
FIG. 14 is a schematic view showing an inner structure of a main housing of the blower in FIG. 10.
Figure 16:
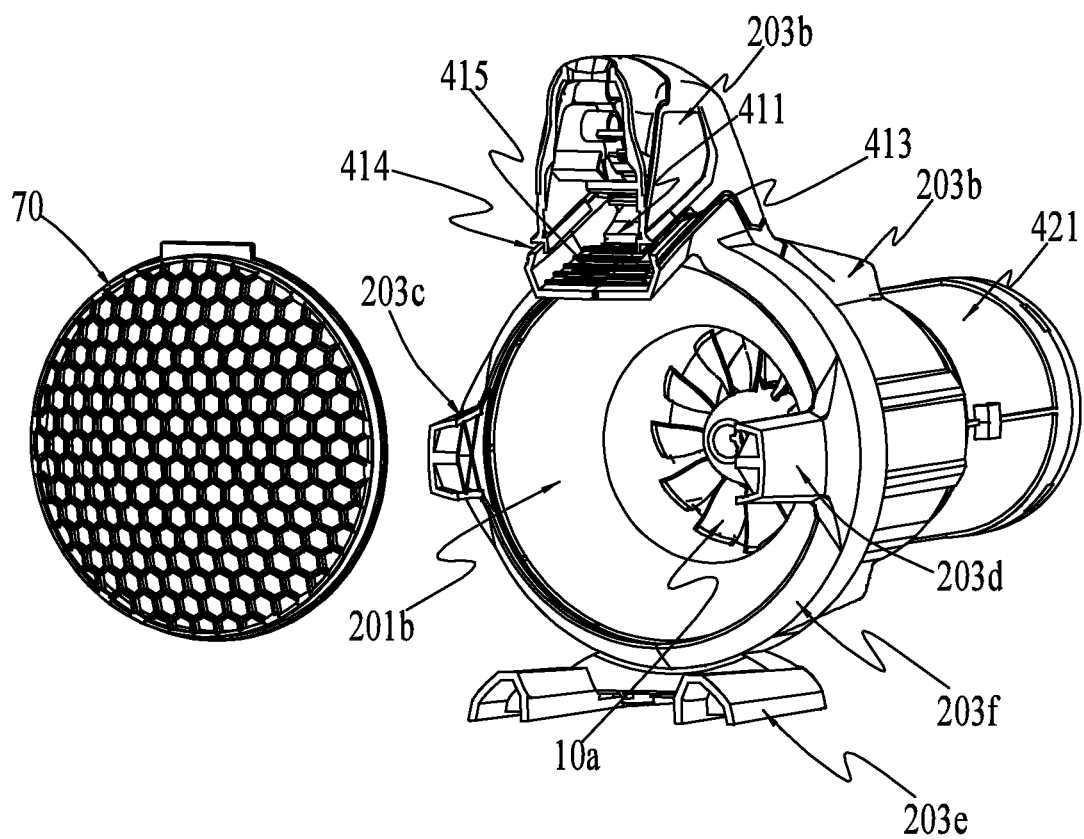
FIG. 16 is a schematic view of the handheld blower in FIG. 10, wherein the handheld blower is truncated by a section and a cover of the handheld blower is removed.

Referring to FIGS. 12, 14 and 16, the cantilever 203b formed by the main housing 41 includes a containing chamber 411 for containing electrical elements and circuits. The handheld blower 200 includes a circuit board 50 for controlling the motor 20. The circuit board 50 is received in the containing chamber 411.

The circuit board 50 or the electrical elements mounted on the circuit board 50 typically generate heat during the control of the motor 20.

As shown in FIG. 14, the circuit board 50 can be disposed at a position within the containing chamber 411 which corresponds to the air intake space 203a. The main housing 41 is provided with a cooling air outlet 412 at the position.

The cooling air outlet 412 can be arranged to correspond to the air intake space 203a in the direction substantially parallel to the central axis 21.

The cooling air outlet 412 allows the containing chamber 411 to communicate with the air intake space 203a. When the fan 10a is driven to rotate by the motor 20, the air in the containing chamber 411 flows from the cooling air outlet 412 and into the air intake space 203a, and then is absorbed into the air duct inlet 201b. The flowing air passes through the circuit board 50 so as to cool the circuit board 50.

Referring to FIGS. 12 and 16, the main housing 41 is provided with a cooling air inlet 413 allowing the air outside the containing chamber 411 to flow into the containing chamber 411. The cooling air inlet 413 is disposed at the cantilever 203b. The circuit board 50 or a part of the circuit board 50 can be disposed between the cooling air inlet 413 and the cooling air outlet 412. The air enters in the containing chamber 411 from the cooling air inlet 413, passes through the circuit board 50 and exits from the cooling air outlet 412 so as to cool the circuit board 50.

As shown in FIG. 16, for better cooling effect, the main housing 41 is further provided with a cooling air inlet 414 that also allowing the air outside the containing chamber 411 to flow into the containing chamber 411

The cooling air inlets 413, 414 can be disposed above the cooling air outlet 412 and respectively on the left and right side of the cantilever 203b.

The cooling air outlet 412 may be provided via use of holes, and the cooling air inlets 413, 414 may be labyrinth for keep foreign matter from entering into the containing chamber 411.

The gripping portion 204 formed by the main housing 41 is provided with a chamber for containing a trigger switch and wires. Due to the negative pressure generated at the cooling air outlet 412, the air in the gripping portion 204 can flow out of the main housing 41 from the cooling air outlet 412.

As shown in FIG. 12, the main housing 41 includes two symmetrical main housing halves 41a, 41b which can constitute a whole.

Figure 13:
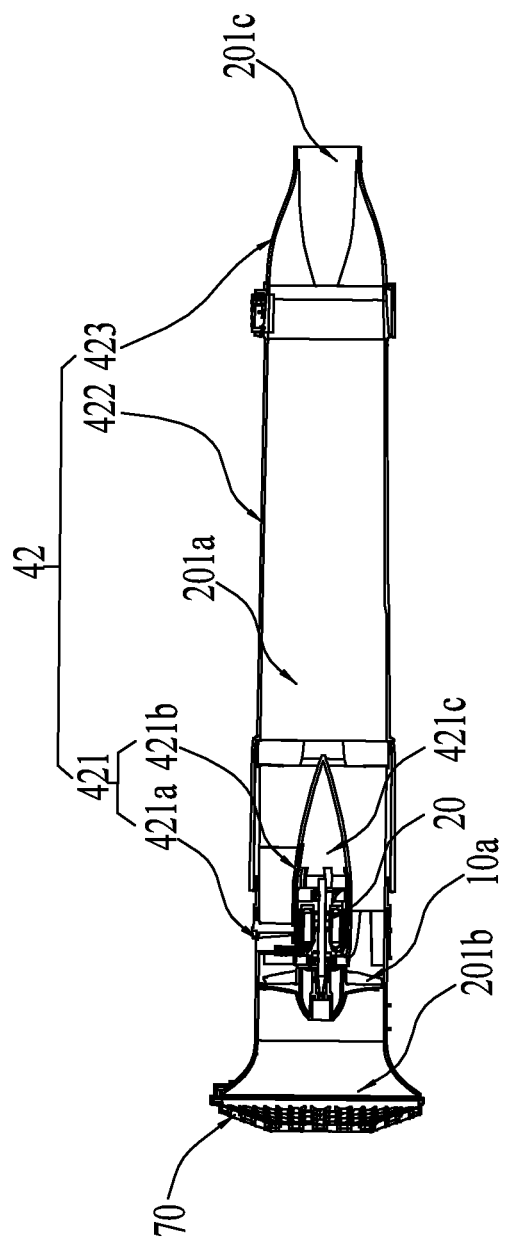
FIG. 13 is a schematic view showing an inner structure of an air duct of the handheld blower in FIG. 10.

Referring to FIGS. 12-13, the air duct housing 42 includes an inner air duct 421 and an outer air duct 422. The inner air duct 421 is partially contained in the outer air duct 422. The inner air duct 421 and outer air duct 422 cooperatively form the air duct 201a or a section of the air duct 201a.

The outer air duct 422 can be connected detachably with the inner air duct 421. So the user can change the outer air duct 422.

Referring to FIGS. 10-13, the air duct housing 42 includes a guiding connector 423. The guiding connector 423 is mounted detachably to a front end of the outer air duct 422 so as to guide the air in the air duct 201a to flow out of the air duct 201a.

As shown in FIG. 13, for the handheld blower 200 with the guiding connector 423, the air duct 201a is constituted by the inner air duct 421, the outer air duct 422 and the guiding connector 423. A rear end of the inner air duct 421 acts as the air duct inlet 201b of the air duct 201a, and a front end of the guiding connector 423 acts as the air duct outlet 201c of the air duct 201a.

As shown in FIG. 12, when the guiding connector 423 is removed, the air duct 201a is constituted by the inner air duct 421 and the outer air duct 422. The rear end of the inner air duct 421 acts as the air duct inlet 201b of the air duct 201a, and a front end of the outer air duct 422 acts as the air duct outlet 201c of the air duct 201a.

Referring to FIGS. 13 and 16, the rear end of the inner air duct 421 has a bellmouth shape which opens gradually from the front to the back so as to allow more air to enter into the air duct inlet 201b. In order to keep foreign matter from entering into the air duct inlet 201b formed by the inner air duct 421, a cover 70 is arranged at the air duct inlet 201b. The cover 70 covers the air duct inlet 201b, which is provided by a plurality of holes. In order to increase the area of the holes of the cover 70, the cover 70 has a spherical surface.

As shown in FIG. 13, the inner air duct 421 includes a duct body 421a and a cabin body 421b. The duct body 421a constitutes a part of the air duct 201a. The cabin body 421b is received in the duct body 421a and includes a chamber 421c for containing the motor 20. The fan 10a is received in the duct body 421a and located in the back of the cabin body 421b. A front end of the cabin body 421b has a streamlined shape and is contracted gradually to form a tip.

As shown in FIG. 12, in order to facilitate the mounting of the motor 20, the inner air duct 421 includes a first portion 421d and a second portion 421e which are connected detachably. The first and second portions 421d, 421e can be connected and detached along the direction of the central axis 21. A part of the cabin body 421b is constituted by the first portion 421d, and other part of the cabin body 421b is constituted by the second portion 421e. When the first and second portions 421d, 421e are separated from each other, the motor 20 can be mounted. After the mounting of the motor 20, the first and second portions 421d, 421e are connected together so that the motor 20 is encapsulated within the cabin body 421b.

During the operation of the handheld blower 200, the air duct portion 201 may accumulate static electricity. As shown in FIG. 14, the blower handheld 200 includes a conducting element 61 and a contacting element 62. The conducting element 61 is made of a conducting material. For example, the conducting element 61 may be a wire. The conducting element 61 is connected within the air duct portion 201 for transferring charge. When the contacting element 62 contacts with a human body, it is capable of transferring static electricity to the human body. The contacting element 62 can be made of a material with a resistance less than or equal to 2010 Ω·m. The contacting element 62 should not be totally made of the conducting material, but a mixed material of the conducting material and an insulating material. So the contacting element 62 can both transfer static electricity but assure the user does not get an electric shock.

The contacting element 62 can be constituted to have a rubber material texture. The contacting element 62 can be exposed to the gripping portion 204, so that the user can contact it when he grips the gripping portion 204. With this arrangement, the static electricity conducted by the conducting element 61 from the air duct portion 201 is transferred to the ground through the contacting element 62 and the hand of the user. Thus, the static electricity at the air duct portion 201 is eliminated.

The conducting element 61 can make the contacting element 62 connect with the inner air duct 421 or connect with the motor 20.

The contacting element 62 can be connected electrically and directly with the inner air duct 421 or the motor 20 through the conducting element 61. That is to say, the conducting element 61 is directly connected with the contacting element 62 and the inner air duct 421 or the motor 20. In other embodiment, the contacting element 62 can be connected electrically and indirectly with the inner air duct 421 or the motor 20 through the conducting element 61. That is to say, the conducting element 61 is connected indirectly with the contacting element 62 and the inner air duct 421 or the motor 20.

Figure 15:
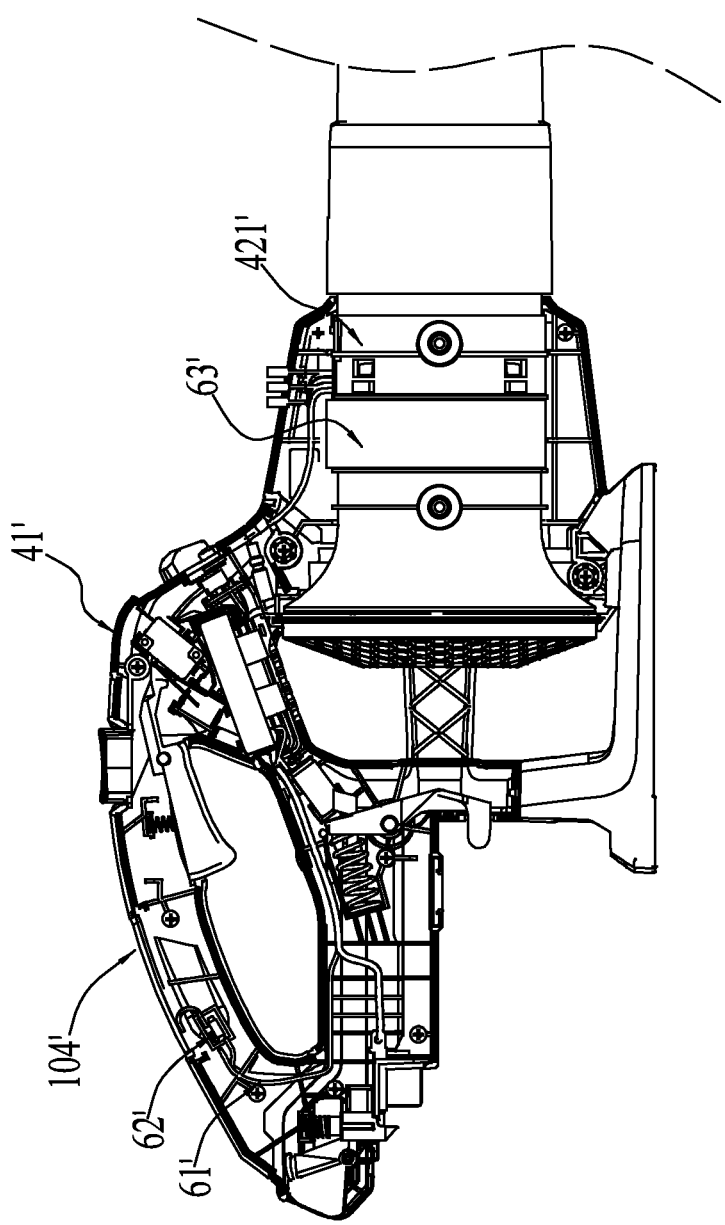
FIG. 15 is a schematic view of the handheld blower with a consuming element.

For example, the conducting element 61 is a first wire. An end of the wire is connected directly with the contacting element 62, and another end of the wire is connected with the circuit board 50. The circuit board 50 is connected with the inner air duct 421 or the motor 20 through a second wire. The circuit board 50 can make the first and second wires connect electrically. It should be also considered that the contacting element 62 and the inner air duct 421 or the motor 20 are connected by the conducting element 61. As shown in FIG. 15, another embodiment of eliminating static electricity is shown. In this embodiment, a conducting element 61' and a consuming device 62' are used to eliminate static electricity.

The conducting element 61' is similar to the conducting element 61. The difference is that the consuming device 62' disposed within a gripping portion 204' is capable of transforming electrical energy to optical energy or thermal energy. The consuming device 62' may include a resistance or a neon tube, which can eliminate static electricity by consuming electrical energy. Alternatively, the consuming device 62' may include both the resistance and the neon tube.

The conducting element 61' can make the consuming device 62' connect directly or indirectly with an inner air duct 421' or a motor within the inner air duct 421'. Alternatively, a conducting ring 63' can be arranged to surround the inner air duct 421' and contact with the inner air duct 421'. The conducting ring 63' is capable of collecting static electricity effectively. The conducting element 61' make the consuming device 62' connect with the conducting ring 63' so that the effect of eliminating static electricity is improved.

During the operation of the handheld blower 200, the fan 10a is rotated to generate air flow; however, a vibration is also generated at the same time. The vibration can be transferred to the inner air duct 421 through the motor 20. If the inner air duct 421 is connected directly with the main housing 41, the main housing 41 will vibrate. The user will feel uncomfortable when he grips the gripping portion 204 formed by the main housing 41.

Figure 17:
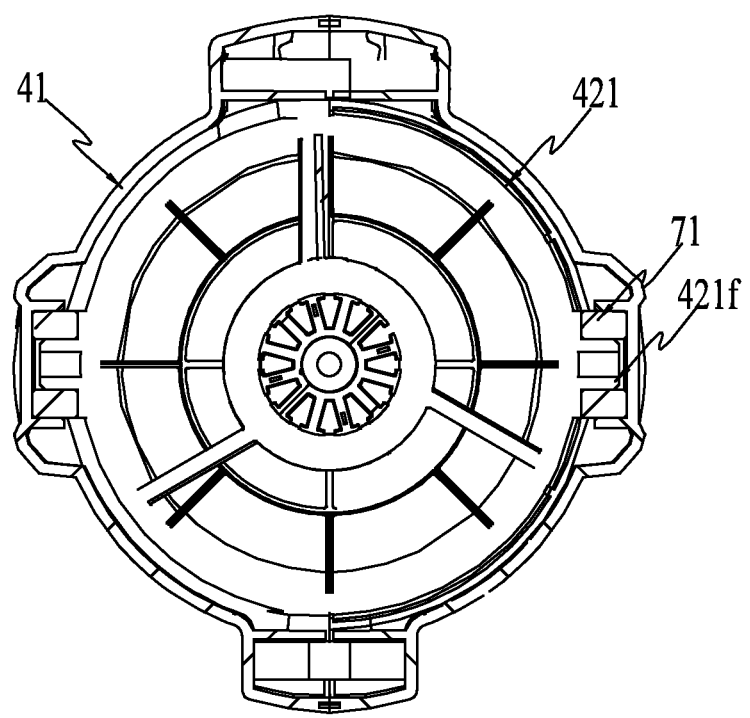
FIG. 17 is a schematic view of a section of the handheld blower in FIG. 10.

Referring to FIGS. 12 and 17, a plurality of damping elements 71, 72, 73, 74 are arranged between the outside of the inner air duct 421 and the inside of the main housing 41, which are made of a flexible material or an elastic material. When the vibration passes through the damping elements 71, 72, 73, 74, the vibration between the inner air duct 421 and the main housing 41 is decreased due to the material characteristics.

The damping elements 71, 72, 73, 74 equally make the inner air duct 421 and the main housing 41 depart from each other at some positions so as not to contact directly with each other, so the vibration transmission at the damping elements 71, 72, 73, 74 is blocked.

The damping elements 71, 72, 73, 74 can be arranged symmetrically. For example, taking the middle plane 204a as a symmetry plane, the damping elements 71, 72, 73, 74 can be distributed on the two sides of the inner air duct 421, and each side has two damping elements.

The damping element 71 may have an annular shape. The inner air duct 421 includes a locating pin 421f on its outside for locating the damping element 71. The damping element 71 can be engaged with the locating pin 421f. Correspondingly, the main housing 41 includes a locating recess on its inside for receiving the damping element 71. The locating recess is not shown, and another symmetrical locating recess 415 can be referred. In order to locate other damping elements 72, 73, 74, the similar locating structure can be used.

It is contemplated that the positions of the locating pin and the locating recess can be exchanged.

Figure 19:
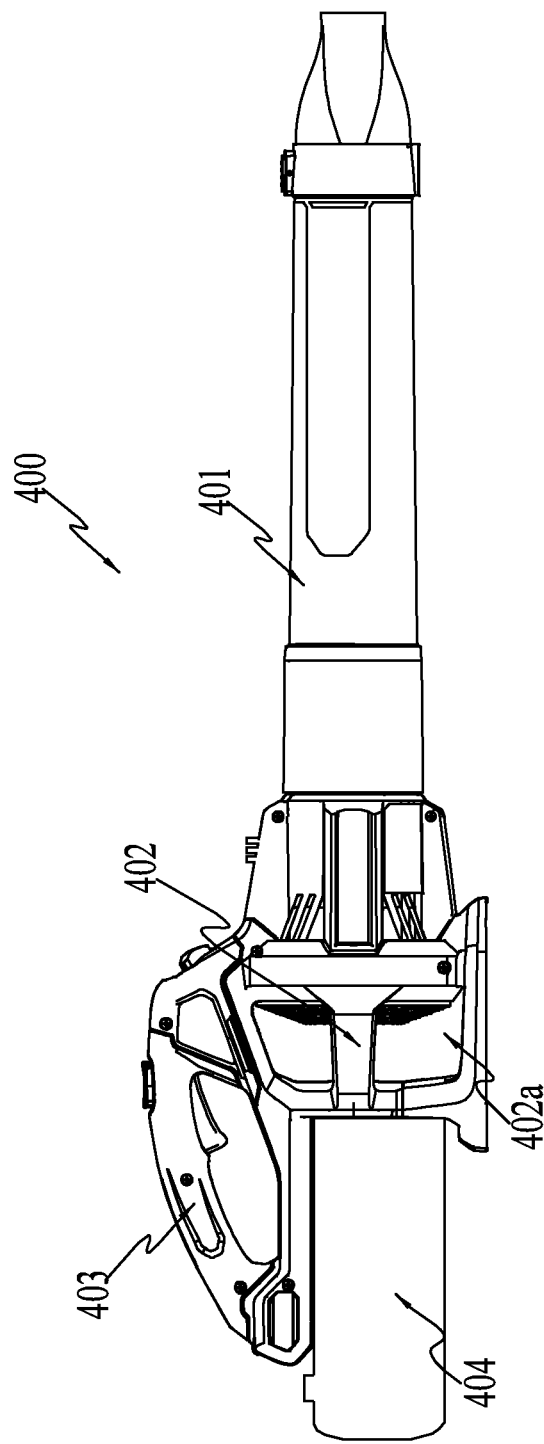
FIG. 19 is a schematic view of an example handheld blower in another embodiment.

As shown in FIG. 19, a handheld blower 400 in a forth embodiment includes an air duct portion 401, a connection portion 402, and a gripping portion 403 which are similar to those of the handheld blower 200 in FIG. 10. The difference is that the handheld blower 400 uses an engine (not shown) as a prime mover and a fuel tank 404 as a power source for supplying power to the engine. The connection portion 402 is disposed between the fuel tank 404 and the air duct portion 401. The connection portion 402 is provided with an air intake space 402a which may have the same structure as the air intake space 203a in FIG. 10.

Figure 20:
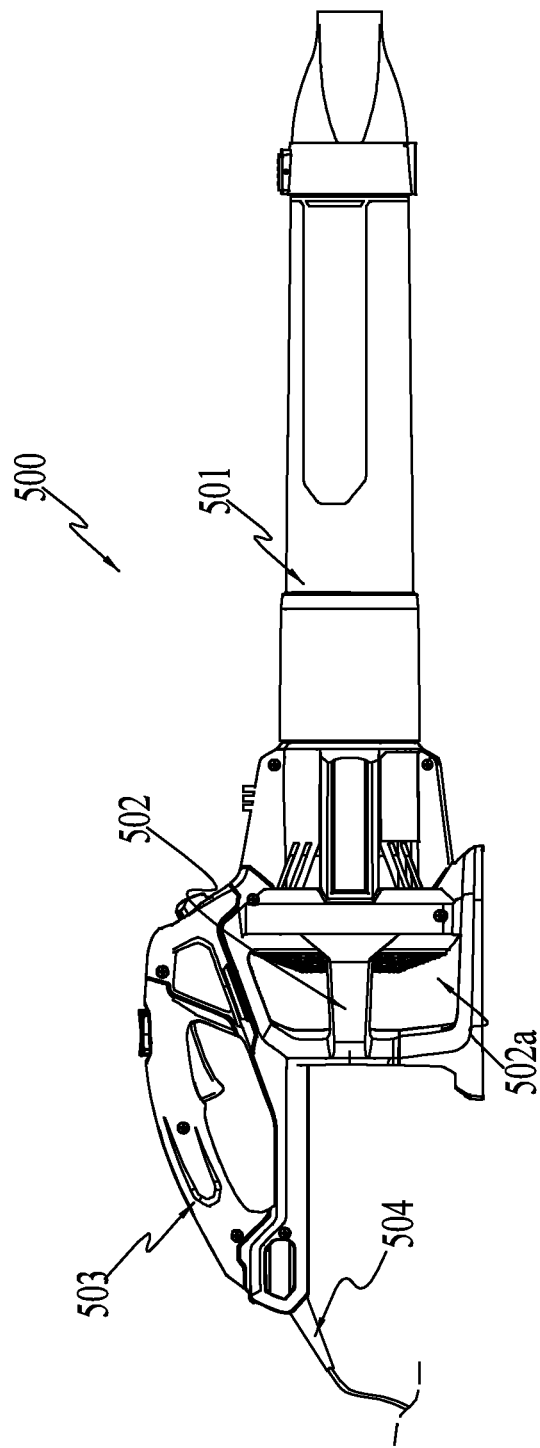
FIG. 20 is a schematic view of an example handheld blower in another embodiment.

As shown in FIG. 20, a handheld blower 500 in a fifth embodiment includes an air duct portion 501, a connection portion 502, and a gripping portion 503 which are similar to those of the handheld blower 200 in FIG. 10. The difference is that the handheld blower 500 uses an AC motor (not shown) as a prime mover and a supply unit 504 connected with an AC power as a power source for supplying power to the AC motor. The connection portion 502 is disposed between the supply unit 504 and the air duct portion 501. The connection portion 502 is provided with an air intake space 502a which may have the same structure as the air intake space 203a in FIG. 10.

The above illustrates and describes basic principles, main features and advantages of the claimed invention. Those skilled in the art should appreciate that the above embodiments are not intended to limit the claimed invention in any form. Technical solutions obtained by equivalent substitution or equivalent variations all fall within the scope of the claimed invention.

We claim:

1. A handheld blower, comprising:
    a fan for generating an air flow;
    a motor for driving the fan to rotate about a central axis;
    a battery pack for powering the motor;
    a housing receiving and supporting the motor,
    wherein the housing comprises:
        an air duct portion comprising an air duct extending along the central axis, the air duct comprising an air duct inlet and an air duct outlet which are respectively located at opposite ends of the air duct;
        a coupling portion for coupling with the battery pack; and
        a connection portion for connecting the air duct portion and the coupling portion, the connection portion defining an air intake space,
    wherein the connection portion is provided with a left inlet allowing the air flow into the air intake space and a right inlet opposite to the left inlet, the housing further comprises a shield covering the left inlet and the right inlet, and the shield is provided with a plurality of holes for allowing the air flow from the left inlet and the right inlet into the air intake space, and
    wherein the battery pack extends substantially along the central axis at a rear side of the air intake space.

2. The handheld blower of claim 1, wherein at least part of the connection portion is disposed at the rear side of the air intake space.

3. The handheld blower of claim 1, wherein when the battery pack is coupled to the coupling portion, at least part of the battery pack is disposed at the rear side of the air intake space.

4. The handheld blower of claim 1, wherein the housing further comprises a gripping portion for a user to grip, and a rear end of the gripping portion is connected to the coupling portion.

5. The handheld blower of claim 4, wherein at least a portion of the gripping portion is extending along a line direction which is intersected obliquely with the central axis.

6. The handheld blower of claim 1, wherein at least part of the fan is disposed in the air duct.

7. The handheld blower of claim 1, wherein the motor is disposed in the air duct.

8. The handheld blower of claim 1, wherein the housing further comprises a gripping portion for a user to grip, at least part of the gripping portion is symmetrical relative to a middle plane, the left inlet is disposed at a left side of the middle plane, and the right inlet is disposed at a right side of the middle plane.

9. The handheld blower of claim 1, wherein the left inlet is disposed at a left side of the coupling portion, and the right inlet is disposed at a right side of the coupling portion.

10. The handheld blower of claim 1, wherein the housing is further provided with a lower inlet arranged on a bottom of the housing.

11. A handheld blower, comprising:
a fan for generating an air flow;
a motor for driving the fan to rotate about a central axis; and
a housing receiving and supporting the motor, wherein the housing comprises a gripping portion for a user to hold, wherein the housing comprises:
an air duct portion comprising an air duct extending substantially along the central axis, the air duct comprising an air duct inlet and an air duct outlet which are respectively located at opposite ends of the air duct;
a coupling portion for coupling with a supply unit for powering the motor; and
a connection portion for connecting the air duct portion and the coupling portion, the connection portion defining an air intake space for allowing the air flow into the air duct,
wherein the connection portion is provided with a left inlet allowing the air flow into the air intake space and a right inlet allowing the air flow into the air intake space, and
wherein the supply unit comprises a battery pack; in an up and down direction, the gripping portion is located on an upper side of the coupling portion and the battery pack is located on a lower side of the coupling portion.

12. A handheld blower, comprising:
a fan for generating an air flow;
a motor for driving the fan to rotate about a central axis;
a housing receiving and supporting the motor; and
a battery pack for powering the motor;
wherein the housing comprises:
an air duct portion comprising an air duct extending substantially along the central axis, the air duct comprising an air duct inlet and an air duct outlet which are respectively located at opposite ends of the air duct;
a coupling portion for coupling with the battery pack;
a connection portion for connecting the air duct portion and the coupling portion, the connection portion defining an air intake space; and
a cover covering the air duct inlet,
wherein the connection portion is provided with a left inlet allowing the air flow into the air intake space and a right inlet allowing the air flow into the air intake space,
wherein when the fan rotates, the air flow enters the air intake space through the left inlet and the right inlet, and then enters the air duct through the cover from the air intake space through the air duct inlet, and
wherein the air intake space is disposed between the cover and the battery pack.

13. The handheld blower of claim 12, wherein the housing further comprises a shield covering the left inlet and the right inlet, and the shield is provided with a plurality of holes for allowing the air flow from the left inlet and the right inlet into the air intake space.

14. The handheld blower of claim 12, wherein at least part of the connection portion is disposed at a rear side of the air intake space.

15. The handheld blower of claim 12, wherein at least part of the battery pack is disposed at a rear side of the air intake space when the battery pack is coupled to the coupling portion.

16. The handheld blower of claim 12, wherein the housing further comprises a gripping portion for a user to grip, and a rear end of the gripping portion is connected to the coupling portion.

17. The handheld blower of claim 16, wherein at least a portion of the gripping portion is extending along a line direction which is intersected obliquely with the central axis.

18. The handheld blower of claim 12, wherein at least part of the fan is disposed in the air duct.

19. The handheld blower of claim 12, wherein the motor is disposed in the air duct.

20. The handheld blower of claim 12, wherein the housing further comprises a gripping portion for a user to grip, at least part of the gripping portion is symmetrical relative to a middle plane, the left inlet is disposed at a left side of the middle plane, and the right inlet is disposed at a right side of the middle plane.

* * * * *